(12) United States Patent
Mercer

(10) Patent No.: US 7,309,990 B2
(45) Date of Patent: *Dec. 18, 2007

(54) FLUX ORIENTATION LOCATING IN A DRILLING SYSTEM

(75) Inventor: John E. Mercer, Kent, WA (US)

(73) Assignee: Merlin Technology, Inc, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/561,289

(22) Filed: Nov. 17, 2006

(65) Prior Publication Data

US 2007/0069732 A1 Mar. 29, 2007

Related U.S. Application Data

(60) Continuation of application No. 11/369,404, filed on Mar. 7, 2006, now Pat. No. 7,154,273, which is a continuation of application No. 10/990,128, filed on Nov. 16, 2004, now Pat. No. 7,061,244, which is a continuation of application No. 10/747,467, filed on Dec. 29, 2003, now Pat. No. 6,838,881, which is a division of application No. 10/453,375, filed on Jun. 2, 2003, now Pat. No. 6,693,429, which is a division of application No. 10/171,489, filed on Jun. 12, 2002, now Pat. No. 6,593,745, which is a division of application No. 09/533,516, filed on Mar. 23, 2000, now Pat. No. 6,417,666, which is a continuation-in-part of application No. 09/058,981, filed on Apr. 13, 1998, now Pat. No. 6,057,687, which is a continuation of application No. 08/731,056, filed on Oct. 9, 1996, now Pat. No. 5,767,678, which is a continuation of application No. 08/442,481, filed on May 16, 1995, now Pat. No. 5,633,589, which is a continuation of application No. 08/259,441, filed on Jun. 14, 1994, now Pat. No. 5,444,382, which is a continuation of application No. 07/958,941, filed on Oct. 9, 1992, now Pat. No. 5,337,002, which is a continuation of application No. 07/662,939, filed on Mar. 1, 1991, now Pat. No. 5,155,442.

(51) Int. Cl.
*G01V 3/11* (2006.01)
*G01V 3/165* (2006.01)
*H04B 13/02* (2006.01)

(52) U.S. Cl. ...................................... 324/326
(58) Field of Classification Search ........ 324/326–329, 324/226, 247; 175/40, 45
See application file for complete search history.

(56) References Cited

U.S. PATENT DOCUMENTS 5,155,442 A 10/1992 Mercer (Continued)

*Primary Examiner*—Reena Aurora
(74) *Attorney, Agent, or Firm*—Pritzkau Patent Group LLC

(57) ABSTRACT

An above ground locator includes an apparatus for determining the strength of the locating signal at a selected point relative to the boring tool. The apparatus includes an antenna arrangement configured for measuring the strength of the locating signal at the selected point along first and second orthogonally opposed receiving axes to produce first and second received signals. A phase shifting arrangement phase shifts the first and second received signals in a predetermined way to generate first and second phase shifted signals, respectively. Thereafter, a summing arrangement adds the first and second phase shifted received signals to generate an output signal which is a vector sum of the first and second received signals. In one feature, third and fourth signals derived from the first and second signals are used to eliminate balance point ambiguity which is present using the first and second signals alone. In another feature, signals corresponding to first, second, third and fourth axes are compared in a way which confines the possible locations of an above ground point to one particular type of region out of a plurality of different types of regions. Tracking of the boring tool may be accomplished in a number of described ways since the regions occur in a specific sequence along the intended path with respect to the location of the boring tool.

17 Claims, 13 Drawing Sheets

U.S. PATENT DOCUMENTS

| | | |
|---|---|---|
| 5,337,002 A | 8/1994 | Mercer |
| 5,444,382 A | 8/1995 | Mercer |
| 5,585,726 A | 12/1996 | Chau |
| 5,633,589 A | 5/1997 | Mercer |
| 5,698,981 A | 12/1997 | Mercer |
| 5,764,062 A | 6/1998 | Mercer |
| 5,767,678 A | 6/1998 | Mercer |
| 5,926,025 A | 7/1999 | Mercer |
| 5,933,008 A | 8/1999 | Mercer |
| 5,990,682 A | 11/1999 | Mercer |
| 5,990,683 A | 11/1999 | Mercer |
| 6,002,258 A | 12/1999 | Mercer |
| 6,005,332 A | 12/1999 | Mercer |
| 6,008,651 A | 12/1999 | Mercer |
| 6,014,026 A | 1/2000 | Mercer |
| 6,693,429 B2 | 2/2004 | Mercer |

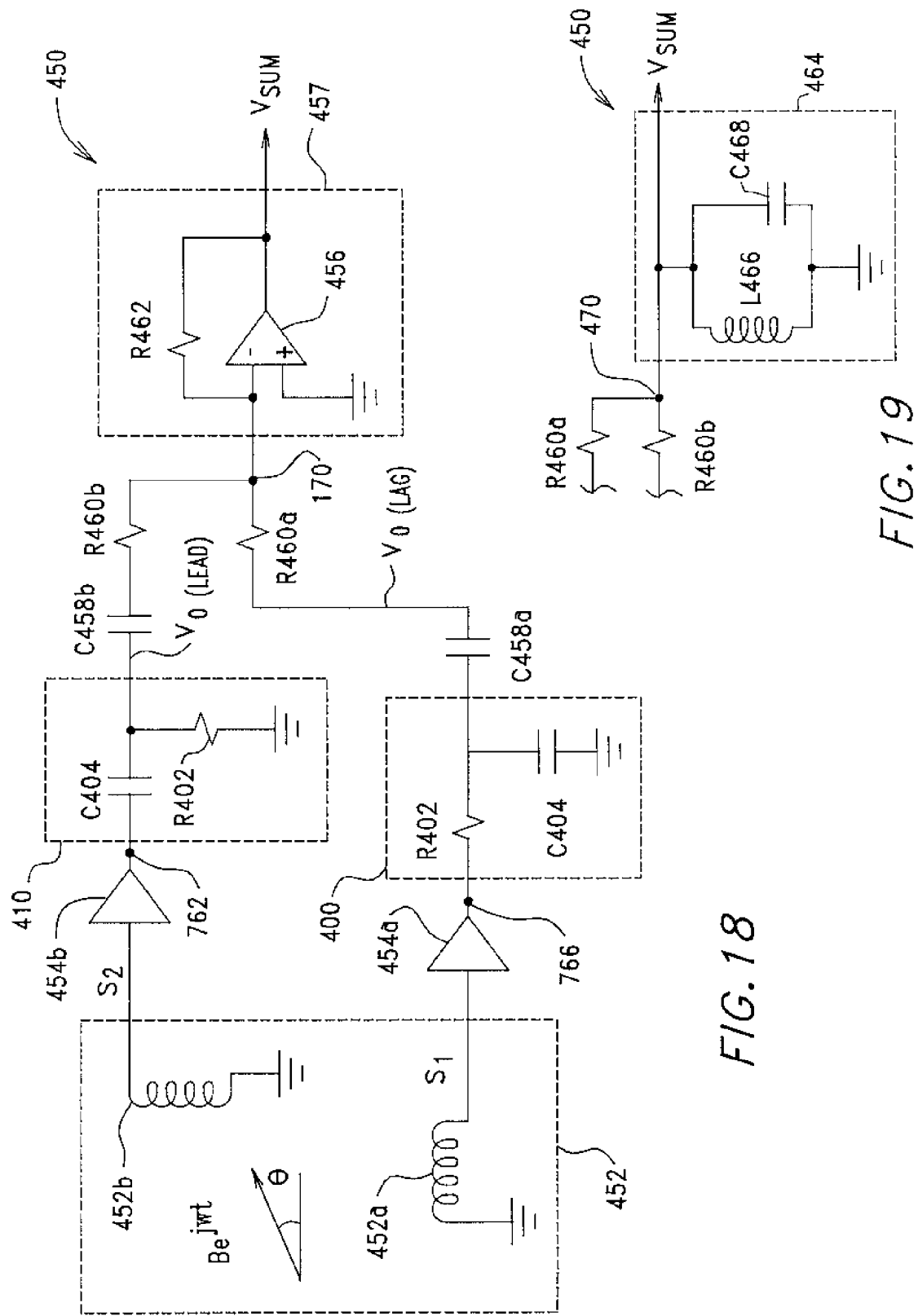

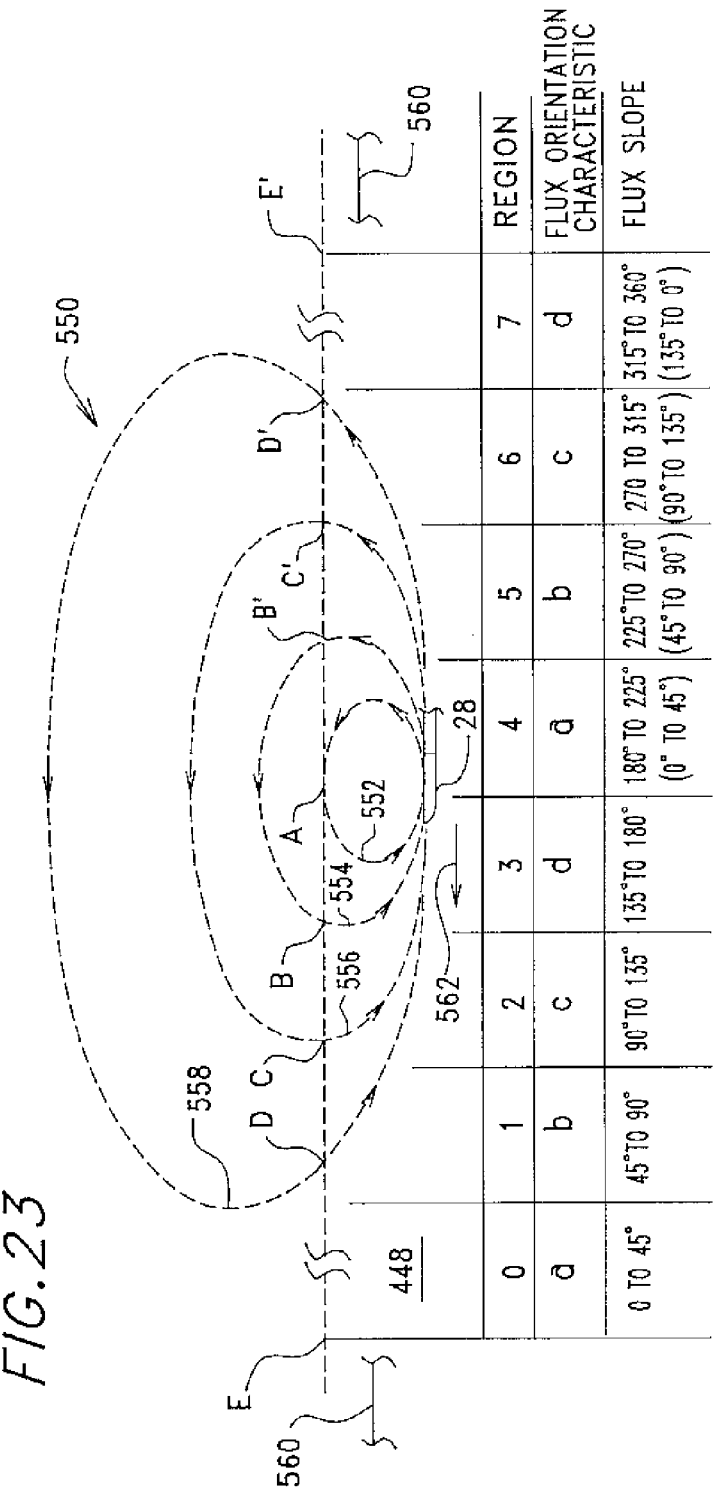

FLUX ORIENTATION LOCATING IN A DRILLING SYSTEM

RELATED APPLICATIONS

This application is a continuation of application Ser. No. 11/369,404 filed on Mar. 7, 2006 now U.S. Pat. No. 7,154,273; which is a continuation of application Ser. No. 10/990,128 filed on Nov. 16, 2004 and now issued as U.S. Pat. No. 7,061,244 on Jun. 13, 2006; which is a continuation of application Ser. No. 10/747,467 filed on Dec. 29, 2003 and now issued as U.S. Pat. No. 6,838,881 on Jan. 4, 2005; which is a divisional of application Ser. No. 10/453,375 filed on Jun. 2, 2003 and now issued as U.S. Pat. No. 6,693,429B2 on Jul. 15, 2003; which is a divisional of application Ser. No. 10/171,489, filed Jun. 12, 2002 and now issued as U.S. Pat. No. 6,593,745B2 on Jul. 15, 2003; which is a divisional of application Ser. No. 09/533,516, filed Mar. 23, 2000 and now issued as U.S. Pat. No. 6,417,666; which is a Continuation-in-Part of application Ser. No. 09/058,981, filed Apr. 13, 1998 and now issued as U.S. Pat. No. 6,057,687; which is a Continuation of application Ser. No. 08/731,056, filed Oct. 9, 1996 and now issued as U.S. Pat. No. 5,767,678; which is a Continuation of application Ser. No. 08/442,481, filed May 16, 1995 and now issued as U.S. Pat. No. 5,633,589; which is a Continuation of application Ser. No. 08/259,441, filed Jun. 14, 1994 and now issued as U.S. Pat. No. 5,444,382; which is a Continuation of application Ser. No. 07/958,941, filed Oct. 9, 1992 and now issued as U.S. Pat. No. 5,337,002; which is a Continuation-in Part of application Ser. No. 07/662,939, filed Mar. 1, 1991 and now issue as U.S. Pat. No. 5,155,442, the disclosures of which are incorporated herein by reference.

BACKGROUND OF THE INVENTION

The present invention relates to apparatus capable of locating and/or monitoring the position (i.e., the depth below a surface and the location within the horizontal plane at that depth) and/or orientation (i.e., yaw, pitch, roll or a combination thereof) of a device located out of view below a surface. More specifically, the present invention is directed to locator/monitor devices that are suitable for use in combination with boring apparatus.

Utilities are often supplied from underground lines. Two techniques are generally used to install such lines. In one technique, the utility line pathway is excavated; the line is installed; and the excavated material is replaced. While this method is suitable for new developments, implementation of this technique is not always practical in previously developed areas. As a result, industry development efforts have been focused on excavating tools capable of installing utilities underground without surface disruption.

Several guided and unguided boring tools are currently on the market. Guided tools require substantially continuous location and orientation monitoring to provide the necessary steering information. A prerequisite of such monitoring is, of course, locating the tool that is to be monitored. Only once the position of the tool is located can a proper depth measurement be obtained, for example, from a measuring position directly above the head of the boring tool which houses a transmitter. Unguided tools would also benefit from periodic locating or substantially continuous monitoring, for example, in prevention of significant deviation from planned tool pathways and close tool approaches to utilities or other below surface obstructions.

Locating or monitoring systems currently used in combination with boring apparatus are either cable locating systems or are based on cable locating technology. Although the more advanced systems perform adequately, limitations on cable locating technology also limit measurement accuracy.

Most cable locators involve receiver detection of an oscillating magnetic field derived from electrical current directly fed or induced onto the cable. The magnetic field lines emanating from a cable are essentially cylindrical in shape, forming concentric circles around the cable. As the current flows along the cable, losses occur as a result of displacement and induced currents into the soil. Consequently, the exact signal strength of the magnetic field emanating from the cable at any point is unknown. Although local signal peaks or nulls (depending on receiver antennas and electronic configuration) are useful to determine the surface position directly above the cable, signal strength (i.e., magnetic field strength) alone is not directly indicative of cable depth. In certain specific circumstances (i.e., when the rate of loss along the cable length is not great), a signal strength ratio can be used to compute depth. If the cable run is straight for a long distance (compared to the depth), the magnetic field strength (B) will be inversely proportional to the distance (d) from the cable to the receiver (i.e., B.alpha. 1/d or B=k/d, where k is a proportionality constant). By taking two signal strength readings at different locations directly above the cable, the proportionality constant can be eliminated and the depth determined.

A simple device for determining the depth of a relatively straight cable is manufactured by Dynatel, a subsidiary of the Minnesota Mining and Manufacturing Company. The Dynatel device includes a single antenna, a gain control knob and a gain doubling switch. The operator determines cable depth by (1) placing the device on the ground above the cable; and (2) adjusting the output displayed on a meter with the gain control knob until the meter needle lines up with a line on the meter scale; (3) doubling the gain with the switch; and (4) vertically elevating the device until the output returns to the original value (i.e., the needle realigns with the meter line referred to in step (2)). Since the magnetic field strength is inversely proportional to the distance, the height of the unit above the ground at step (4) is equal to the depth of the cable. This procedure is accurate, but time consuming. It also becomes impractical for more deeply buried cables, requiring the operator to raise the device above his head.

Other currently used cable locating devices employ two antennas and logic circuitry to determine depth. The antennas are separated by a fixed distance. With this known separation distance and magnetic field strength readings at the antennas, cable depth can be computed. The difficulty with these devices is that there are practical limits regarding antenna separation. If the cable depth is much larger than the antenna separation, which is generally approximately 12 to 18 inches, signal strength measurement accuracy becomes more critical. Measurement accuracy is affected by differential drifting of the electronics associated with the antennas as well as differential responses of the antennas themselves.

Various approaches have been taken to enhance magnetic field strength measurement precision. The accuracy of these approaches increases as the number of components common to the two measurement circuits increases. Current systems accomplish this by taking a magnetic field reading at one antenna; switching the electronics connection from one antenna to the other; and measuring the magnetic field strength at the second antenna. Although this switching methodology eliminates many sources of error, one major error source remains—the antennas. To increase sensitivity, ferrite rods are sometimes employed to enhance the effective capture area of the antennas. As a result of the antenna separation, both antennas may not experience the same thermal environment. The characteristics of ferrite vary measurably with temperature and are not consistent between rods. Alternatively, large diameter air-core coils are employed. Such coils eliminate the inconsistency of the ferrite rods, but still exhibit thermal drift problems. Air-core coils also are generally larger in diameter.

All of these spatially separated two-antenna devices must be periodically calibrated. Any aging or drifting of an antennas will cause rapid loss in cable depth measurement accuracy, particularly at depths that are large compared to antenna separation. In cable locators, this is generally not a serious problem, since most cables are buried at depths of less than 2 or 3 times the separation.

A device conforming to the above-described arrangement is available from Radiodetection Ltd. (Bristol, England), the RD300. The device includes two antennas with horizontal coil axes disposed a fixed vertical distance from each other. In operation, the device is placed on the ground, such that a first receiving antenna sensor is near ground level (e.g., within about 1-2 inches) and a second receiving antenna is located about 16 inches thereabove. The ground therefore serves as a reference surface for depth measurement. One disadvantage of this particular prior art device and other devices that operate similarly thereto manifests itself when the reference surface exhibits an obstruction such as a curb, a rock, landscaping or the like, at a desired measurement location. Under these circumstances, an operator must compensate for the obstruction to obtain the depth below the reference surface. Another disadvantage of this equipment is that the depth measurement process is time consuming even after the device is properly located above the transmitter (i.e., a needle must be aligned with a meter line through a knob-actuated adjustment process). Radiodetection Ltd. applies this technology to cable, sewer and pipe location as well as horizontal boring tool monitoring.

The principal means of locating a boring tool head for guidance purposes is to place a radio frequency transmitter in the tool head, and track the tool from the surface using a radio frequency receiver that detects the alternating magnetic field emanating from the transmitter.

While this is similar to the cable-locating situation, the type of measurement necessary for accurate guided boring differs, and the requirements therefore are more stringent. Transmitters or sondes generally emit a dipole magnetic field in the normal measurement range, which differs from the source or source-like magnetic field emanating from a utility cable. When a single horizontal antenna is used to measure the strength of a dipole magnetic field, that parameter varies as depicted in FIG. 1a.

A transmitter 10 is located directly below a maximum field strength point 12. Nulls 14 are present in the horizontal field directly ahead and behind maximum 12, causing local peaks 16 in field strength. If a locator/monitor operator were to commence operations at a location substantially ahead or behind the actual transmitter 10 location, he might locate one of local peaks 16 and believe the tool to be directly below. In order to be certain that field strength maximum 12 has been located when using single horizontal antenna devices, another peak must be found and evaluated to be lower in strength (i.e., to be a local peak 16). An operator failing to take this precautionary measure may conclude that transmitter 10 is located at a position that leads or trails its true location. Erroneous depth readings and subsequent misplacement of the bore typically result.

A single vertical antenna fares no better. A vertical antenna will produce a null directly above the transmitter. This null exists along a line extending on both sides of the transmitter, however, and therefore cannot be used to locate a point, such as the transmitter location. Data from a combination of two antennas may be manipulated to provide a more accurate indication of transmitter location. An orthogonal set of antennas can produce the monotonic signal strength variation shown in FIG. 1b.

When guiding a boring tool, the operator constantly requires accurate depth measurements, and time consuming procedures, such as the single antenna cable locator utilizing gain doubling, are therefore not practical. For tool control purposes, the operator must be able to determine the depth gradient to ascertain the direction (i.e., up or down) in which to steer. Gradient determinations require greater precision than depth measurement. Also, boring depth may be a factor of 0 or more greater than practical antenna separation limits of spatially separated two antenna locators.

U.S. Pat. No. 7,806,869 issued to Chau et al. discusses a 5-sensor receiver apparatus capable of "locating the position of a boring device within the ground with respect to a particular reference location along an above ground path directly over the intended course" of the boring device. In this receiver, four sensors are arrayed at the four corners of a square within a horizontal plane (i.e., parallel to the surface), the midpoint of which is displaced vertically from the fifth sensor. Chau et al. indicate that such a receiver is an improvement over a 4-sensor device designed to locate/ monitor electronically conductive cable, having sensors located at the end points of two intersecting lines of equal length within a plane that is perpendicular to the surface.

The 4-sensor cable-locating apparatus was not designed for continuous monitoring. Signals from the horizontally placed sensors are used to locate the transmitter, while signals from the two vertically aligned sensors are used to determine cable depth. Such a process is impractical for continuous monitoring.

In contrast, the 5-sensor apparatus utilizes signals from the two horizontally disposed sensors, located in the plane perpendicular to the desired path of the boring device and within which the boring device is actually positioned, and the vertically displaced sensor to determine boring device depth and displacement from its intended path.

The disadvantage of the 5-sensor device is its complexity. This device is also susceptible to locating local peaks 16 in the signal strength. Also, the operator of a 5-sensor device traverses the desired boring device path, rather than locating a position directly above the device.

Again, these 4- and 5-sensor prior art receivers incorporate sensors that are in fixed spatial positions with respect to each other. In contrast, U.S. Pat. No. 4,646,277 issued to Bridges et al. includes a sensing assembly formed of three orthogonal pick up coils. The sensing assembly of the Bridge et al. patent serves as a homing beacon for a boring apparatus, rather than a means to establish the position of the tool head.

U.S. Pat. No. 3,906,504 issued to Guster et al. describes a method of locating and plotting tunnels using a portable receiver to monitor a transmitter moving through the tunnels. Guster et al. employ an antenna having a vertical axis in the transmitter. While this antenna configuration eliminates nulls, such an arrangement is not practical in a boring application, because the head of the boring apparatus rotates.

Signal strength emanating from a vertically oriented antenna would therefore vary during boring.

Also, Guster et al. employ very complex mathematics in determining the distance between the transmitter and the receiver. The need for a calibration system involving complicated electronics for use with the Guster et al. system is discussed, without further explanation, at Column 2 of the patent. The Guster et al. estimate regarding the complexity of calibration electronics appears to be accurate in view of the nature of the depth determination employed in the patent.

In addition, Guster et al. employ a pulsed transmitted signal, so as to avoid interference with verbal communication between the receiver operator and the transmitter operator. Pulsed transmitted signals complicate the locating/monitoring process carried out by the receiver.

Steering a boring device also requires information concerning pitch (i.e., angle above or below the X-axis in an XY plane, where the X-axis corresponds to the longitudinal axis of the boring device and the Y-axis is parallel to the gravity vector). Several pitch sensors are known and commercially available. Most of these pitch sensors will not produce a pitch angle independent of the roll orientation (about the X-axis). Those that can produce a roll-insensitive signal are generally expensive to produce and easily damaged by shock loads. Less expensive pitch-sensing devices are generally not sufficiently sensitive or well damped. Because equipment loss is common, most users are reluctant to invest a large amount of money in components that are deployed underground. Consequently, development of low cost pitch sensors capable of surviving the loads and environment associated with boring through soil, rock and debris has been pursued.

U.S. Pat. No. 4,674,579 issued to Geller et al. describes two pitch-sensing devices. One apparatus features a transmitter that includes a mercury switch connected in such a manner that the transmitter is deactivated when the tip of the housing is upwardly inclined. The inclination of the tip may be determined by an operator by measuring the angle of rotation at which the transmitter switches on and off. This type of pitch-sensing device is not highly accurate as a result of inaccuracy in measuring the roll angle of the tool head. This process is also time consuming, thereby reducing the practicality of implementing such a methodology.

The second pitch-sensing device shown in FIG. 8 of and described in the Geller et al. patent includes a first common electrode and two pad-electrode assemblies, including the second and third electrodes, housed within a glass envelope. The glass tube is partially filled with an electrolytic fluid, such that the resistance between the second and third electrodes and the first common electrode varies with the inclination (i.e., pitch) of the device. This pitch-sensing device can be costly to implement.

An additional difficulty with locating and monitoring boring apparatus having a transmitter housed in the boring tool head is that the structural loads and wear experienced by the tool head require that the head be fabricated from a high strength material such as steel or some other metal. Since metals conduct electricity, a transmitter contained within a metal tool head induces a current in the metal. This induced current, in turn, induces a magnetic field that cancels the transmitted field to some extent and, in some circumstances, entirely.

In order to allow the signal emitted by the transmitter to radiate to the surface, one or more windows or openings have been fabricated or machined into the conductive boring tool head. Employing this solution structurally weakens the tool head and may allow debris or ground water to enter the tool head and impinge upon the transmitter, thereby destroying the antennas and/or the related electronics. To avoid such debris and water damage and in an effort to bolster the strength of the windowed tool head, these openings have been filled with composite, ceramic or plastic materials, thereby sealing the transmitter and antennas. These filler materials are not as durable as metal, however, and generally fail long before a metal structure would fail. Typically, filler material failure results in costly electronics destruction. Since the tool structure is weakened by the window, premature tool head failures resulting in the loss of both the tool head and the electronics may also occur, however.

Another difficulty with the use of the window concept is that the radiated field strength becomes a function of tool head orientation. Specifically, in a single window configuration, the field is strongest when emanating from the window and measurably weaker 180° therefrom. Although this result can be useful in determining the tool head roll orientation, it makes it impossible to determine tool depth accurately while drilling, because the tool head is rotating during drilling. To overcome this restriction, multiple small window or slot tool head designs have also been used with mixed success.

In another attempt to overcome this radiated signal problem, the entire tool head structure has been formed with non-conductive materials such as composites and ceramics. Unfortunately, none of these substitute materials exhibits all of the desirable characteristics of steel or other durable conductive metals. Strong ceramics do not handle impact loads as well, while composites do not take abrasive wear as well. These substitute materials are also much more costly than metals.

SUMMARY OF THE INVENTION

The present invention provides a locator/monitor capable of locating a boring tool head for control purposes. The locator/monitor of the present invention is compact, portable, easy to carry and user friendly. Accurate boring tool head depth and orientation measurements may be obtained through flexible procedures that may be modified in accordance with the circumstances under which a measurement is to be made. Precise and continuous depth and periodically updated orientation measurements provide the information necessary to locate and steer the tool head. Depth (i.e., the distance between the reference surface and the transmitter) may also be presented to an operator of the locator/monitor of the present invention as range (i.e., a monotonic function indicative of the distance between the receiver and the transmitter). Straightforward calibration and expedited locating methodology may also be implemented using apparatus of the present invention.

The locator/monitor of the present invention achieves these goals through the operation of an antenna assembly featuring two orthogonal antennas. The antennas are located in spatial proximity to each other (i.e., they are not disposed a fixed distance apart), thereby decreasing the size of the locator/monitor and providing monotonic magnetic field strength information. Once calibrated (i.e., the value of the proportionality constant k relating magnetic field strength and range is known), continuous measurement of range or a gradient thereof, and periodic updated indications of orientation are possible. No manipulation of equipment controls is necessary to initiate or continue generating such data.

Calibration of the locator/monitor of the present invention is achievable through a simple procedure. An operator need only locate the transmitter; deploy the receiver of the locator/monitor of the present invention at a first convenient height above the transmitter location; measure the magnetic field strength emanating from the transmitter; deploy the receiver at a second convenient height; and measure the magnetic field strength emanating from the transmitter. To permit the value of the proportionality constant to be determined, an independent indicator of the distance between magnetic field strength measurement points is provided by locator/monitors of the present invention. A preferred independent indicator is an ultrasonic receiver-to surface measurement system.

The transmitter may be located in an expeditious manner by "following" dipole magnetic flux lines to the transmitter (i.e., determining the minimum distance to the transmitter, indicated by a maximum magnetic field strength reading as the receiver is rotated) in a stepwise fashion. Staged progress is achieved, because dipole magnetic flux lines are not typically straight line paths to the transmitter (they are local tangents to the flux line along the transmitter axis). Sensitivity of this locating procedure can be enhanced by using the square of the magnetic field strength. Ease of accomplishing the locating method is increased by a beeper or visual function designed to indicate passage through a measurement maximum or to predict such passage. The maximum value may be stored in memory to permit later comparisons with new measurements, with beeper or visual indications occurring when a measurement equals or exceeds that held value. The signal squared procedure may also be used to determine yaw orientation of the transmitter.

The present invention also provides a pitch sensor capable of supplying orientation data for devices such as boring tools. The pitch sensor of the present invention may also act as a level reference or an accelerometer. The principal advantages of pitch sensors of the present invention are durability and cost effectiveness.

The pitch sensor of the present invention includes a conductive central rod, running the length of a conductive assembly; two sections of conductive tubing separated by a small gap, where the length of tube sections and gap correspond collectively to the length of the conductive assembly; and electrically conductive fluid disposed within the conductive assembly in an appropriate amount. The amount of conductive fluid is selected, such that the central rod of the pitch sensor is contacted by the conductive fluid when the pitch sensor is in a horizontal position.

The present invention also provides a transmitter housing formed of a conductive material such as a metal, where the magnetic field generated by the transmitter is capable of penetrating to the surface. In this manner, the structural strength of the housing is preserved; the electronics are protected from debris and water infiltration; and a symmetrical magnetic field is produced by the transmitter.

Radiated signal strength is enhanced by increasing the equivalent induced electrical current path length in the conductive metal transmitter housing of the present invention. This increase is achieved by the presence of slots in the housing structure. Preferably, the diameter of the antenna's coil is small in comparison with the housing diameter. In addition, an increased number of slots consistent with maintaining the structural integrity of the housing is also preferred.

The present invention provides further advantages in a system for locating a boring tool which is disposed within the ground in which the boring tool is configured for transmitting a locating signal. An above ground locator forms part of the system and includes an apparatus for determining the strength of the locating signal at a selected point relative to the boring tool. The apparatus includes an antenna arrangement configured for measuring the strength of the locating signal at the selected point along first and second orthogonally opposed receiving axes to produce first and second received signals. A phase shifting arrangement phase shifts the first and second received signals in a predetermined way to generate first and second phase shifted signals, respectively. Thereafter, a summing arrangement adds the first and second phase shifted received signals to generate an output signal which is a vector sum of the first and second received signals.

In one aspect of the invention, an antenna pair including first and second orthogonal antennas define an antenna plane. The first and second antennas generate first and second signals, respectively, from the locating signal such that, for an initial fixed orientation of the antenna pair relative to the particular path, in which the antenna plane extends generally along the particular path, the locating signal exhibits two different types of balance points for different above ground positions. At these balance points, however, the first and second antennas each receive the locating signal having an equal magnitude such that the position of the antenna pair is ambiguous as to balance point type. Accordingly, the present invention provides an improvement for eliminating ambiguity as to the type of balance point by producing third and fourth signals in a predetermined way. The third and fourth signals may be obtained in one way by rotating the antenna pair by 45° from the initial fixed orientation in the antenna plane and then measuring the locating signals with the rotated antenna pair. A determination is made as to which type of balance point the antenna pair is positioned based on the first, second, third and fourth signals. In one feature, the third and fourth signals are not measured, but are generated using the first and second signals.

In another aspect of the invention, the signals corresponding to the first, second, third and fourth axes are compared in a way which confines the possible locations of the above ground point to one particular type of region out of a plurality of different types of regions. The regions are defined along the intended path of the boring tool by certain characteristics of the locating signal in proximity to the intended path and with respect to the boring tool. Tracking of the boring tool may be accomplished in a number of disclosed ways since the regions occur in a specific sequence along the intended path with respect to the location of the boring tool.

BRIEF DESCRIPTION OF THE DRAWINGS

FIG. 18 is a schematic diagram illustrating a vector sum receiver designed in accordance with the present invention which produces a vector sum signal from the inputs of a pair of orthogonal antennas.

FIG. 19 is a schematic diagram illustrating one portion of the vector sum receiver of FIG. 18 having an LC tank circuit substituted for an electronic amplifier to show one modification required in the circuit of FIG. 18 to provide a vector sum circuit using passive circuitry.

FIG. 22 is a diagrammatic elevational view, in cross-section, showing a boring tool, its intended path with reference to the surface of the ground and certain flux lines of a locating field emanating from the boring tool, shown here to illustrate characteristics of the slope orientation of the flux within regions recognized by the present invention for use in the disclosed highly advantageous locating procedures.

FIG. 23 is a diagrammatic illustration showing the X antenna configuration of FIG. 20 in relation to the flux slope orientation regions recognized by the present invention.

FIG. 24 is a diagrammatic illustration showing a "+" (plus) antenna configuration which may be the antennas of FIG. 23 either physically or, preferably, electronically rotated, shown here to illustrate the + antenna configuration in relation to the flux slope orientation regions recognized by the present invention.

DETAILED DESCRIPTION

While the following preferred aspects of the present invention are described with reference to use thereof in combination with boring apparatus operating in a generally horizontal plane, these aspects are amenable to other uses and applications, as will be recognized by practitioners in the relevant arts. For example, the apparatus of the present invention may be designed to determine the magnetic field strength-depth relationship based on an inverse proportionality (i.e., magnetic field strength α 1/depth) for cable locating purposes.

Boring apparatus that may be used in combination with the locator/monitor of the present invention are any apparatus capable of or modifiable to be capable of generally horizontal boring and housing a transmitter in a manner allowing a signal emanating from the transmitter to penetrate sufficiently for surface signal detection. Such boring apparatus are known and commercially available. Exemplary boring apparatus useful with the present invention include Ditch Witch P40 and P80, Tru-Trac, and Jet-Trac (Charles Machine Work), Direct Line (Straight Line Manufacturing) or GuideDrill (Utilx, Kent, Wash.).

Figure 2:
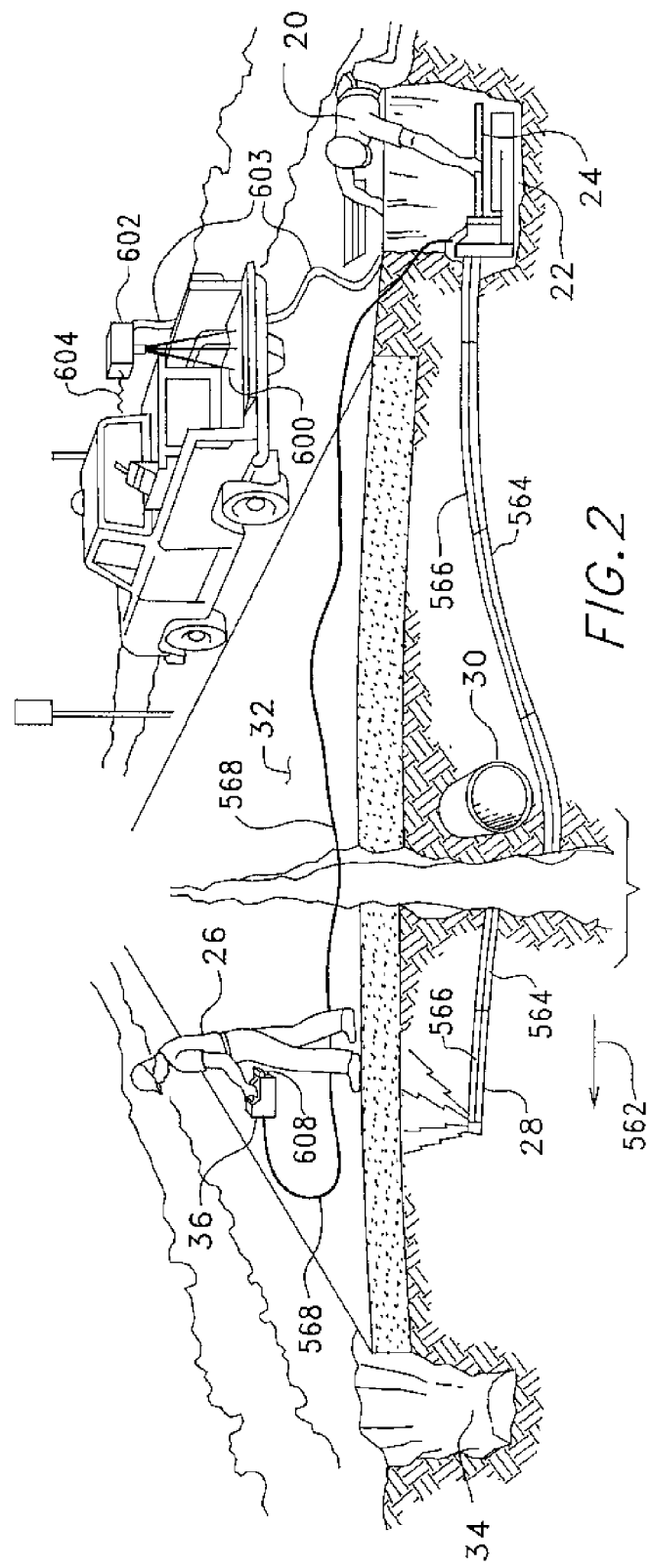
FIG. 2 shows a partial cross-sectional view of a typical horizontal boring operation.

A typical horizontal boring operation is shown in FIG. 2. The operation generally requires two or more operators. A first operator 20, who may be located in the vicinity of a starting pit 22, is responsible for operation of a boring machine 24. A second locator/monitor operator 26 is responsible for locating a boring tool head 28 and determining steering commands therefor. Tool head 28 is guided around an obstacle 30 at a generally constant depth beneath a reference surface 32 until it reaches a termination pit 34. Locator/monitor operator 26 holds a receiver 36 and uses it to locate the surface position directly above tool head 28. Once locator/monitor operator 26 finds this position, receiver 36 is used to determine the depth of tool head 28. Using a locator/monitor of the present invention, operator 26 can also determine the orientation (yaw, pitch and roll) of tool head 28.

As stated above, the boring apparatus houses the transmitter component of an embodiment of the locator/monitor of the present invention that includes a receiver and a transmitter. Alternatively, the locator/monitor of the present invention may consist of a receiver component designed to cooperate with a transmitter that is already in place or has been obtained separately. In either case, transmitters useful in the present invention are known and commercially available. Exemplary transmitters are 10/SC 0412-8 and 10/SC 0322-8 (Radiodetection Limited, Bristol, England) and Flocator (Utilx, Kent, Wash.). A preferred transmitter of the present invention includes a pitch and roll sensor, as described herein. Such preferred transmitters may be used with other receivers or as accelerometers or level references in related or unrelated applications.

Transmitted dipole magnetic fields are preferred for use in the practice of the present invention, because, in part, such fields are fairly constant with time. For the low transmission frequencies used in boring applications, ground attenuation is generally not significant. In contrast to the horizontal cable situation, the magnetic field strength-distance relationship for a dipole magnetic field-generating or -approximating transmitter is inversely cubic along a straight line from the dipole. Specifically, the magnetic field strength (B) at a distance (d) from the transmitter may be represented as follows:

$$B \alpha 1/d^3$$

or $$B = k/d^3$$

where k is a proportionality constant related to the transmitter signal strength. Because of the inverse cube—relationship between the parameters, the strength of a dipole magnetic field is a very sensitive indicator of transmitter depth changes. As set forth above, a proportionality constant based on an inverse relationship may alternatively be determined for cable locating or other appropriate applications.

Figure 3A:
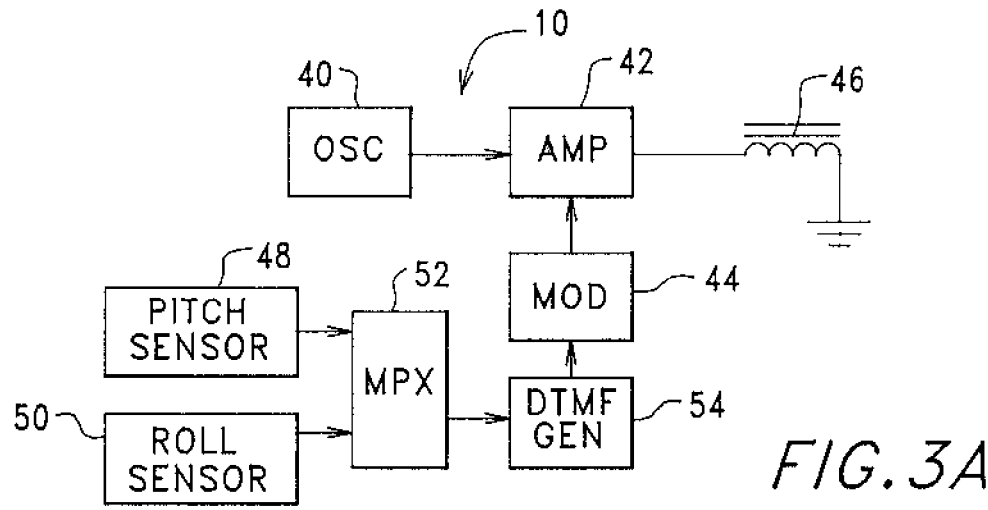
FIGS. 3a and 3b show block diagrams of a transmitter of the locator/monitor of the present invention.

FIG. 3a shows a block diagram for a preferred embodiment of transmitter 10 useful in the practice of the present invention. Transmitter 10 incorporates a low frequency oscillator 40 operating from about 4 kHz to about 100 kHz, with about 33 kHz preferred. Oscillator 40 drives an amplifier 42 that is amplitude modulated by a modulator 44. The modulated output of amplifier 42 drives an antenna 46. Modulator 44 provides amplifier 42 with a series of digitally encoded signals derived from a pitch sensor 48 and a roll sensor 50. Specifically, digital output signals from sensors 48 and 50 are multiplexed by a multiplexer 52 which, in turn, drives a Dual-Tone MultiFrequency (DTMF) generator 54. The tone pair produced by DTMF generator 54 modulates the output signal of modulator 44. Specifically, the output of modulator 44 includes the carrier and two side tones. A tone pair is preferred over a single tone as input to modulator 44, because the dual tone requirement lessens the probability that a random signal could be interpreted as data by the receiver. In this system, two legitimate tones are required to constitute data. An analogous system is used in touch-tone telephones to eliminate noise. While this invention will be described with reference to a DTMF generator, it should be understood that other techniques, such as a pulsed signal on a separate carrier frequency can be used to advantage in this context.

Figure 3B:
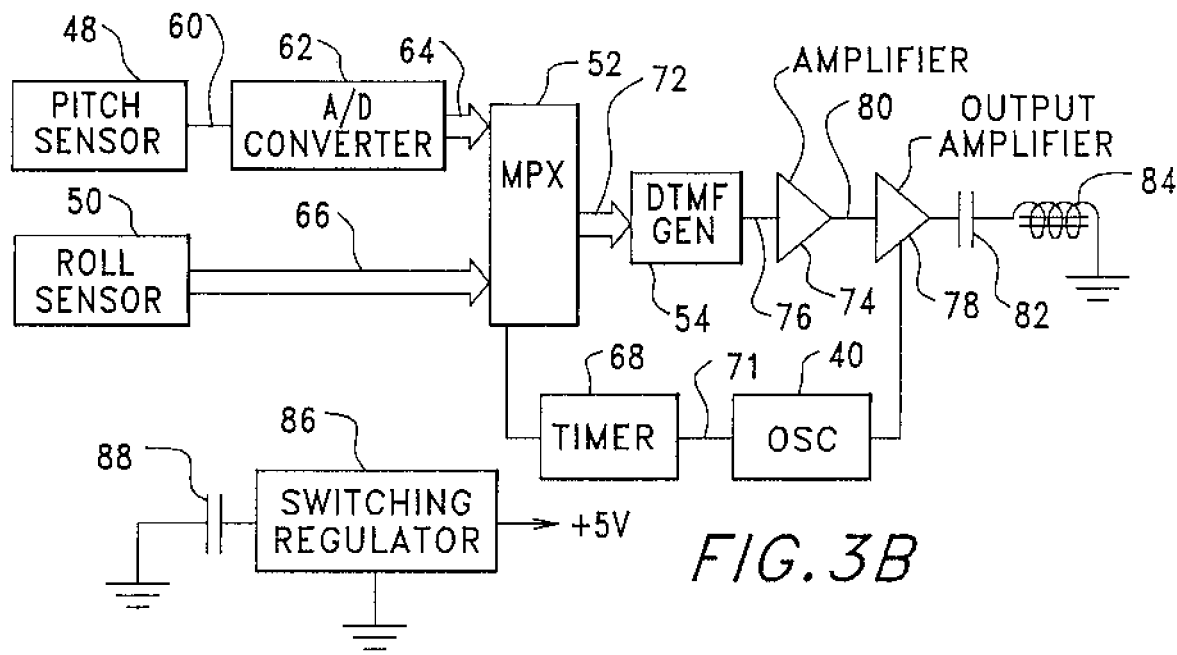

A block diagram of an alternative and preferred electronics configuration of transmitter 10 of the present invention is shown in FIG. 3b. Transmitter 10 consists of a pitch sensor 48 to measure the attitude of tool head 28 relative to gravity. Pitch sensor 48 provides an analog signal through line 60 to an A/D converter 62. The digitized output of A/D converter 62 is fed by a data bus 64 to multiplexer 52.

Roll or tool head 28 angle is also measured relative to gravity by means of roll sensor 50, a 12-position mercury switch. The output signal of roll sensor 50 is in digital format, so it can be directly fed to multiplexer 52 by a bus 66. Multiplexer 52 is switched between buses 64 and 66 by a timer 68. The output signal of timer 68 is dependent upon oscillator 40 frequency fed to timer 68 by a line 70 (i.e., oscillator 40 frequency is divided to a much lower frequency by timer 68).

Multiplexer 52 provides four, 4-bit nibbles of data through a bus 72 to DTMF generator 54 which produces tone pairs from a selection of frequencies that differ from the carrier frequency. For example, tone pairs may be chosen from 8 frequencies below 1 kHz. As a result, the transmitter of the present invention may employ the same or similar DTMF chips as are used in touch-tone telephone applications, with the chip being clocked at a slower frequency by timer 68 than would be the case in a telephone application. The tone pair is fed to an amplitude modulation amplifier 74 through a line 76. The output signal from modulation amplifier 74 controls the voltage of an output amplifier 78 and is fed to output amplifier 78 through a line 80. Output amplifier 78 is driven, for example, in class D operation (i.e., output amplifier 78 is turned on and off at the carrier frequency, thereby decreasing power dissipation) at, for example, 32768 Hz by oscillator 40. The amplitude modulated signal is fed to a capacitor-inductor pair (82, 84) operating at series resonance of, for example, 32768 Hz. Inductor 84 is preferably an antenna producing a dipole magnetic field. Oscillator 40 frequency may be any frequency that does not interfere with the DTMF generator 54 tone pair and that is not subject to substantial ground attenuation.

Regulated 5 volt power is provided to transmitter 10 by a voltage-controlled switching regulator 86 to which current is supplied by a battery 88. The individual components of transmitter 10 are known and commercially available, with the exception of the preferred pitch sensor described below.

As a result, one of ordinary skill in the art could construct and implement transmitter 10, as contemplated by the present invention.

Figure 4:
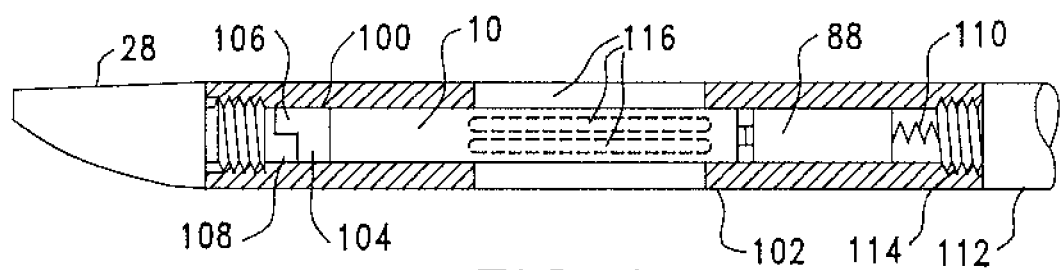
FIG. 4 shows a cross-sectional view of a boring tool incorporating a transmitter of the locator/monitor of the present invention.

A cross-sectional view of transmitter 10 housed within a typical directional drilling tool head 28 is shown in FIG. 4. Transmitter 10 is sized and configured for sliding engagement within an elongated opening 100 formed in a steel tool body 102. A keyed end section 104 of transmitter 10 consists of a semicircular element 106 which engages a similar keyed head element 108 located on tool head 28. Battery 88 is also slidingly engaged within opening 100 and contacts transmitter 10, thereby making one electrical connection. The other electrical connection is made through a spring 110 attached to a remaining drill string 112 through a set of threads 114. One or more elongated slots 116 in steel tool body 102 provide for penetration of steel tool body 102 by the magnetic field generated by transmitter 10.

While the interface between transmitter 10 and tool body 102 is described and depicted as a keyway/key arrangement, any other interfacing mechanism capable of stabilizing transmitter 10 within tool body 102 at an appropriate orientation may be used. The appropriate orientation of transmitter 10 is any one in which data from pitch sensor 48 and roll sensor 50 may be properly related to the pitch and roll of tool head 28. Similarly, a specific set of electrical connections and structure for making them are described and depicted. Any similar mechanism may be employed to achieve this end. One of ordinary skill in the art could therefore interface transmitter 10 with boring apparatus 24 and provide power thereto to produce a dipole magnetic field.

Figure 1A:
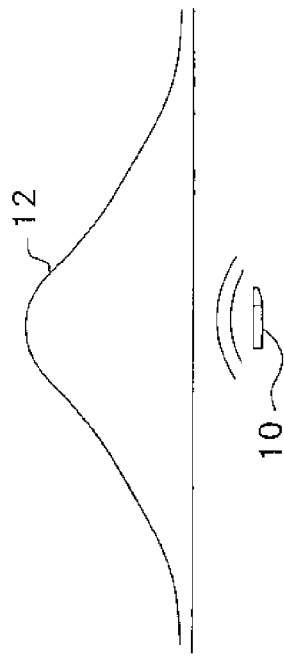
FIG. 1a indicates magnetic field strength as measured by a single antenna.
Figure 1B:
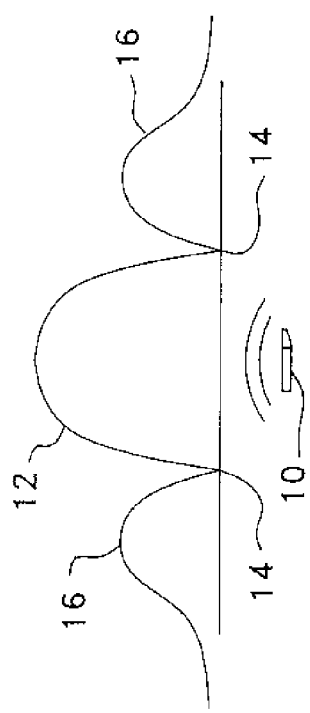
FIG. 1b indicates magnetic field strength, as measured by two orthogonal antennas.

Receiver 36 of a preferred embodiment of the present invention involves a single antenna location employing two orthogonally disposed antennas. If two orthogonal antennas are used to measure the horizontal and vertical components of a dipole magnetic field, and those components are vectorially added, the magnetic field strength varies as shown in FIG. 1b. The orthogonal pair of receiving antennas provide the total magnetic field strength in the plane of the orthogonal antennas axes. As a result, the indicated distance to transmitter 10 will be a monotonic function of the true distance to transmitter 10 along dipole flux lines. Once the location directly above transmitter 10 is determined, a depth reading taken at that position will indicate the true depth, because the field strength perpendicular to transmitter 10 is approximately zero at that point.

The surface location directly above transmitter 10 can be found by searching for the minimum distance reading on the receiver 36 display. Since the monotonic function exhibits only one peak, maximum point 12, locator/monitor operator 26 cannot be misled with respect to transmitter 10 location. Two orthogonal antennas in close spatial relationship are useful in the practice of the present invention, because locator/monitor operator 26 almost always knows the general direction of the bore. If this direction were also unknown, a third antenna, orthogonal to the plane defined by the other two, could be incorporated in receiver 36. In the three-antenna embodiment of receiver 36 of the present invention, the three dimensional components of the magnetic field strength are vectorially added to eliminate all ambiguity regarding transmitter 10 position (i.e., true depth or range is indicated at all times, because the total field is being measured).

Preferably, the two antennas functioning as depth receivers in the present invention are oriented such that one is disposed at a 45° angle to a horizontal plane passing through receiver 36 parallel to the base thereof, and the other is oriented orthogonally thereto. When the antennas are oriented in this configuration and are balanced, and receiver 36 is located directly over transmitter 10, the induced signal (i.e., the amplified receiving antenna output signal) will be the same for both antennas. Antennas are not always balanced, however. If the antennas are not balanced, inaccurate transmitter 10 location will result.

As a result, the present invention may include an automatic antenna balancing means that may be initiated in or as a prerequisite to receiver 36 modes, such as antenna balancing, transmitter locating or calibration, for example. Specifically, an automatic adjustment may be made to amplified antenna output signal gain of a first antenna to balance it with a second antenna amplified output. If the output signal from a first antenna ($OS_1$) is not equal to the output signal from a second antenna ($OS_2$) at a location where it should be equal, $OS_1$ will be adjusted by a factor of $OS_2/OS_1$ for each subsequent measurement. Consequently, the amplified output signals from the two antennas (i.e., the antenna/amplifier systems) will be balanced.

Antenna balancing may be accomplished at any point relative to transmitter 10 that equal signal strength is expected at each antenna. Receiver 36 antenna balancing may be conducted, for example, at a point directly over transmitter 10, directly behind or in front of transmitter 10 along the longitudinal axis thereof, or the like.

If a spatially-separated, prior art two antenna device is used with a dipole field, the sensitivity of that device (i.e., the percentage change in output signal divided by the percentage change in distance) depends on the ratio of antenna separation to depth. Measurement sensitivity therefore decreases with increasing depth. On the other hand, if signal strength alone is used in computation as contemplated by the present invention, the locator/monitor measurement sensitivity becomes depth-independent. As a result, a locator/monitor operating on signal strength in an antenna separation-insensitive manner, such as that of the present invention, could be as much as an order of magnitude more sensitive at a depth of 10 feet. To achieve depth-independent measurement sensitivity, the proportionality constant relating distance to the cube root of magnetic field strength must be conveniently determinable, however.

The aforementioned factors and parameter relationships indicate, and the prior art has recognized, that the distance between transmitter 10 and receiver 36 can be obtained using magnetic field strength measurements alone once the proportionality constant has been determined.

The proportionality constant depends upon a variety of parameters, such as soil characteristics, tool body attenuation and battery strength. As a result, locator/monitors of the present invention should be calibrated (i.e., the proportionality constant should be determined) before use under new conditions or after a substantial period of continual use. Since calibration is required often, a simple procedure therefor, as provided by the present invention, is desirable.

A method to accurately determine the proportionality constant in an antenna separation-insensitive manner is to measure the magnetic field strength at two positions using a "single antenna location" device (e.g., two orthogonal antennas disposed in close spatial proximity), such as the locator/monitor of the present invention. In such a device, the single antenna location is moved between two measurement positions by an operator. Consequently, the spacing between the two measurement positions can be much larger than that of a spatially separated two-antenna device, since packaging requirements do not limit the distance between measurement positions in locator/monitors of the present invention.

In the practice of the present invention, the magnetic field strength ($B_1$) is measured by the orthogonally disposed antennas at a first position that is located a distance $d_1$ from transmitter 10. Similarly, magnetic field strength ($B_2$) is measured at a second position that is vertically displaced from the first position and located a distance $d_2$ from transmitter 10. If the distance d between the first and second positions is known, the variables k, $d_1$ and $d_2$ may be calculated by solving the following equations:

$$B_1 = k/d_1^3$$

$$B_2 = k/d_2^3$$

$$d = (d_1 - d_2)$$

An important feature of this process is that d is accurately ascertainable. As a result, an accurate independent measurement system is incorporated into receiver 36 of locator/monitors of the present invention, so that the distance between the two measurement positions can be determined. The independent distance measuring means could also be separate from the receiver, but such a configuration is not preferred.

One method of achieving such accurate measurement is the use of an ultrasonic measuring device to precisely reference the elevation of receiver 36 above surface 32. An ultrasonic system measures distance by monitoring the time it takes a signal to travel from an ultrasonic transmitter to the surface and back to an ultrasonic receiver. A temperature sensor is preferably included in the ultrasonic measuring device to measure the ambient temperature and correct for the speed of sound variation with temperature. Knowing the distance between the measurement locations d and the two magnetic field strengths $B_1$ and $B_2$, the proportionality constant k and transmitter 10 depth can be determined.

Figure 5A:
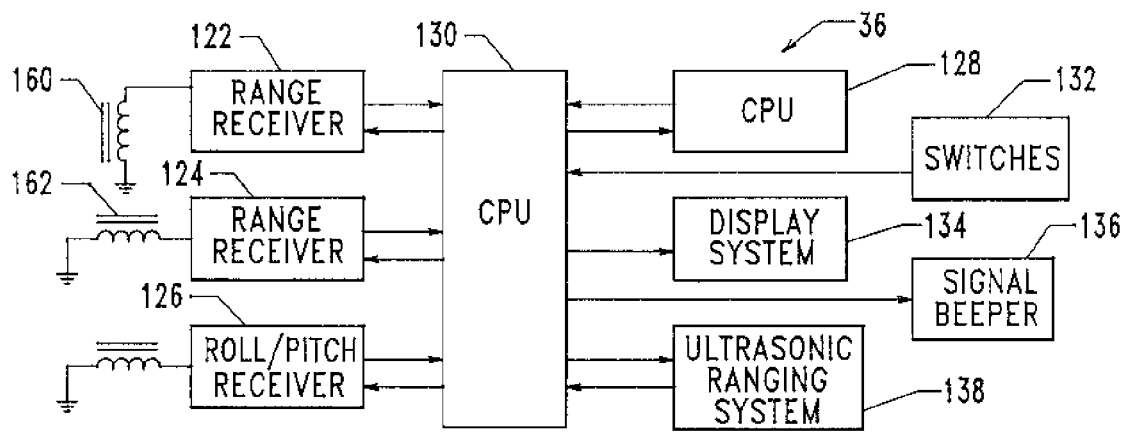
FIGS. 5a and 5b show block diagrams of a receiver of the locator/monitor of the present invention.

FIG. 5a shows a block diagram of a preferred embodiment of a receiver 36 useful in the present invention. Receiver 36 includes three separate receiving units: a first range receiver 122, a second range receiver 124 and a roll/pitch receiver 126. First and second range receivers 122 and 124 preferably involve antennas arranged orthogonally with respect to each other, measuring the vertical and horizontal components, respectively, of the magnetic field emanating from transmitter 10. Range receivers 122 and 124 have very narrow band-pass filters preferably centered on the carrier frequency that strip the modulation side-bands from received signal to provide a steady amplitude carrier signal used for range computation by a CPU 128. Roll/pitch receiver 126 demodulates the received signal and decodes it into 4-bit nibbles that provide roll and pitch orientation information.

The roll-pitch data and the range signals are fed into a CPU interface 130 that converts the analog signals into digital format for processing by CPU 128. CPU interface 130 also sets the gain in range receivers 122 and 124 to maintain the signals in the dynamic range of an A/D converter within CPU interface 130. CPU interface 130 also accepts signals from switches 132 that control receiver 36 functions. Other functions of CPU interface 130 are to drive a display system 134, a signal beeper 136 and an ultrasonic ranging system 138, such as an ultrasonic transducer.

Antenna range receivers 122 and 124 used in receiver 36 of the present invention differ from the spatially separated antennas used in prior art devices. Antenna range receivers 122 and 124 measure different components of the magnetic field emanating from transmitter 10 and are located in spatial proximity to each other.

Figure 5B:
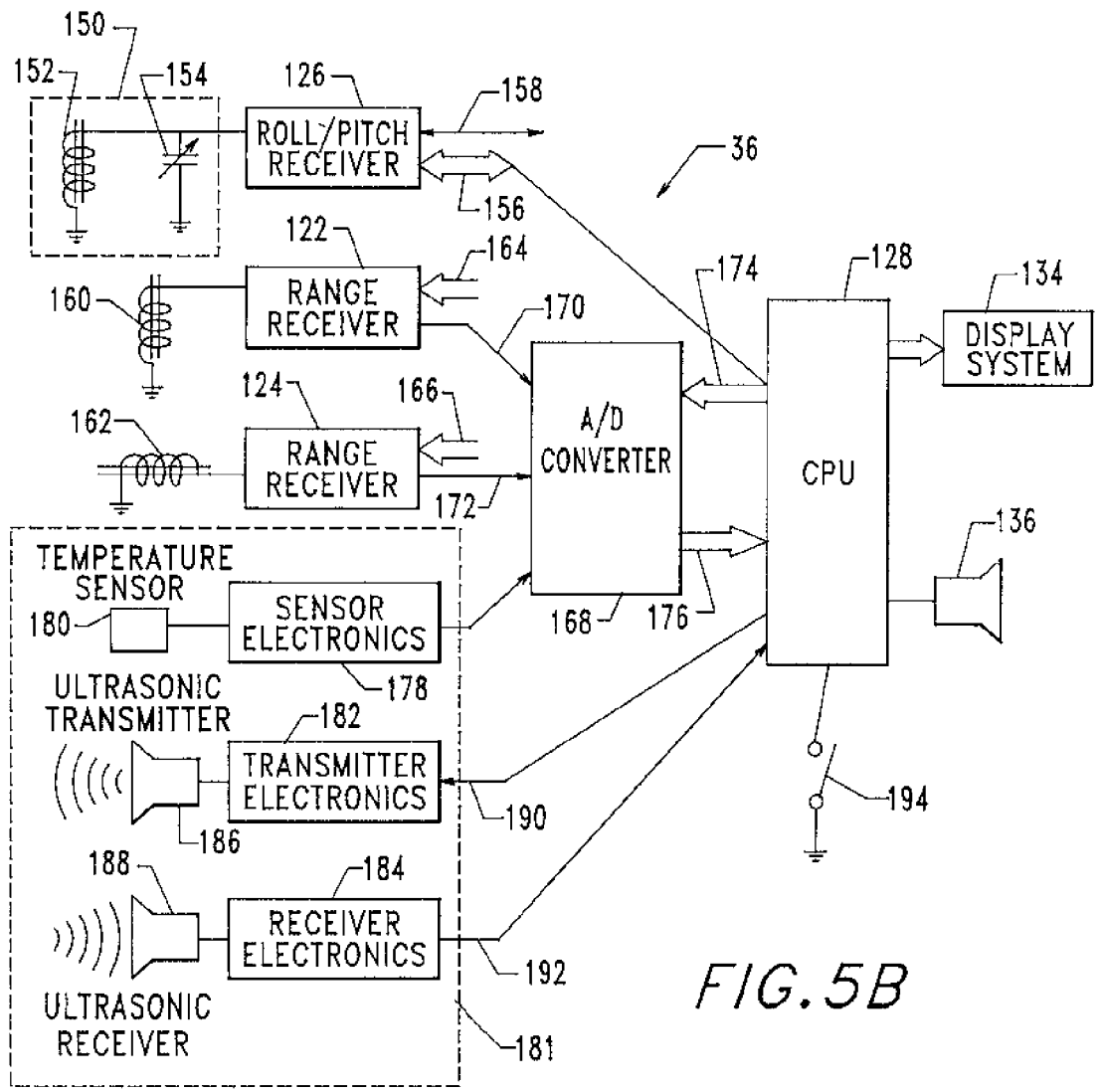

The block diagram of an alternative and preferred embodiment of receiver 36 is shown in FIG. 5b. In this embodiment of the present invention, roll-pitch receiver 126 includes a tuned antenna system 150 composed of a coil 152 and a variable capacitor 154. Receiver 126 communicates with CPU 128 through data bus 56 and data strobes 158. Each range receiver 122, 124 has associated linear antennas 160 and 162, respectively, which are orthogonally disposed. The axes of antennas 160 and 162 may, for example, be offset 45° from a horizontal plane passing through receiver 36 parallel to the base thereof. Gain control buses 164 and 166 permit CPU 128 to set the gain values of range receivers 122 and 124. Range receivers 122 and 124 produce an output voltage related to the range from receiver 36 to transmitter 10 and the controlled gain setting of CPU 128. These voltages are fed to a multiplexer and analog-to-digital (A/D) converter 168 through a set of wires 170 and 172. Multiplexer-A/D converter 168 is controlled by a control bus 174 from CPU 128. Channel selection is performed by CPU 128 through control bus 174, and the digitized data are returned to CPU 128 by means of a data bus 176.

A temperature sensor 180 and associated electronics 178 form a part of ultrasonic ranging system 181, including an ultrasonic transmitter 186, an ultrasonic receiver 188 and associated electronics 182 and 184, respectively. Ultrasonic transmitter 186 generates an ultrasonic pulse of sufficient strength and duration to facilitate accurate ultrasonic receiver 188-to-surface 32 measurements. Such pulses may, for example, range from about 30 kHz to about 60 kHz and extend from about 0.25 ms to about 5 ms. A transmitted ultrasonic pulse of approximately 40 kHz and 1 ms duration, for example, is initiated by CPU 128 through a strobe line 190. CPU 128 measures the time between pulse transmission and pulse return, communicated to CPU 128 through a line 192. CPU 128 then calculates the receiver 36-surface 32 range based on the time and ambient temperature.

A control switch 194 provides operator input signals to CPU 128 to control power switching and the various operational modes (e.g., calibration, location, depth measurement, peak signal holding, and range compensation).

Beeper 136 provides operational mode information as well as confirmation and error signaling. Beeper 136 may also be activated during transmitter 10 locating processes as described herein. Data are presented on display 134. Display 134 is preferably configured to supply information on location and orientation of transmitter 10 as well as receiver 36 battery status. Other useful data may also be displayed, if desired.

Receiver 36 is capable of constantly comparing rates of change (i.e., gradients) of the vectorially added magnetic field strength components to provide locator/monitor operator 26 with an indication of his direction of motion relative to transmitter 10 (i.e. toward or away from transmitter 10). Once positioned substantially directly above transmitter 10, operator 26 can rotate receiver 36 to the left or right to determine the yaw orientation of boring apparatus 24 using the displayed field strength rate of change. This operator 26 position is also appropriate for obtaining accurate depth measurements.

The individual components of receiver 36 are known and commercially available. For example, ultrasonic measurement devices useful in receiver 36 are ME 251-1603 (Mouser) and P9934-ND and P9935-ND (Panasonic). As a result, one of ordinary skill in the art could construct and implement receivers 36 as contemplated by the present invention.

Optical means, such as used for camera focusing, or mechanical means may alternatively be employed to determine the distance between magnetic field strength measurement positions. One of ordinary skill in the art would be able to design and implement these distance measuring means.

Since receiver 36 of the locator/monitor of the present invention has only one antenna location, it can be very compact. The prior art two antenna location systems, for example, must accommodate the antennas and the fixed separation therebetween.

The locator/monitor of the present invention is self-calibrating, in that the proportionality constant between magnetic field strength and the inverse cube of the distance between transmitter 10 and receiver 36 can be recomputed at any time. Recalibration might be undertaken when concern about transmitter 10 output or ground attenuation deviation, receiver antennas 122 or 124 alterations resulting from thermal effects, for example, or when any other concern regarding measurement accuracy arises. The calibration procedure uses the transmitter signal from the boring tool, so that the calibration can be conducted during boring. That is, the calibration process of the present invention is not so distinct from normal operation as to require a cessation of normal operation therefor. Since the locator/monitor of the present invention involves only one antenna location, there is only one antenna location/electronics path. As a result, only the linearity of the response in receiver 36 electronics affects measurement accuracy. Fortunately, with modern electronic circuits, linearity is generally not a problem.

Calibration of receiver 36 is performed by holding it close to surface 32 and switching it into calibration mode as described herein. Receiver 36 measures field strength and the ultrasonic range to surface 32. Receiver 36 is raised a vertical distance above the first measurement location, and a second set of measurements is recorded. CPU 128 combines the data from the measurement sets; calculates the range proportionality constant; and stores the information. Notification of correct calibration procedures are accomplished by display 134 and beeper 136.

Digital processing allows for verification of signals by comparing readings and other tests as described herein. Also, CPU 128 circuitry can compensate for the height that operator 26 holds receiver 36 above surface 32. This feature is important when surface 32 obstructions, such as rocks or landscaping, are located at a measurement position. Such an obstruction falsely alters the level of surface 32, thereby falsely increasing or decreasing (if the obstruction is a ditch or hole of some sort) the depth of transmitter 10. In this situation, operator 26 will employ ultrasonic ranging system 138 of the locator/monitor of the present invention at a location adjacent to but free from the obstruction and at a height greater than that of the obstruction. This distance measurement is stored in CPU 128 memory. Operator 26 deploys receiver 36 over the obstruction at substantially the same height that it was deployed at the closely adjacent location. CPU 128 uses the stored distance-to-surface value and displays the depth of transmitter 10 below reference or extended surface 32, despite the obstruction.

A preferred pitch sensor useful in the practice of the present invention is durable and cost effective. Components used to produce a prototype device were obtained from plumbing supply, hardware, or hobby stores and constituted standard fittings and tubing. When used as a pitch sensor for horizontal boring applications, the sensor of the present invention is insensitive to roll orientation.

Figure 6:
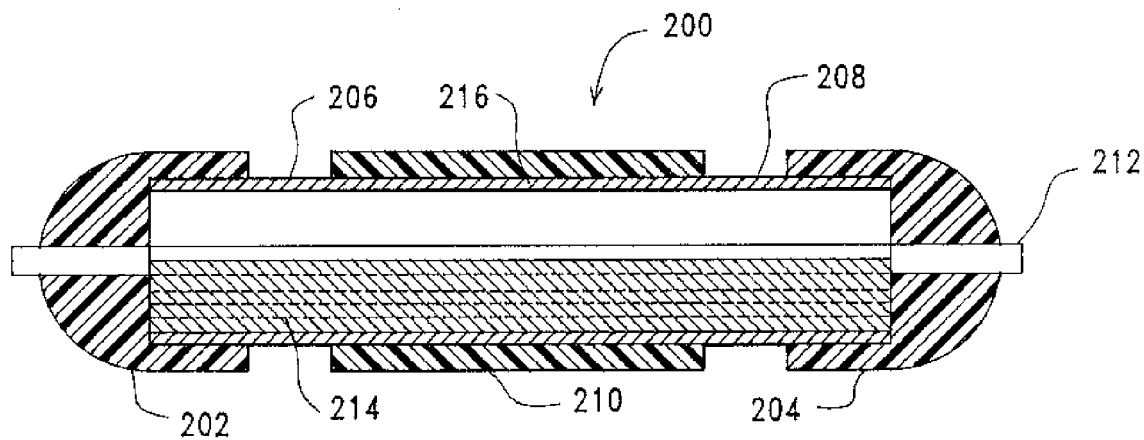
FIG. 6 shows a cross-sectional view of a pitch sensor of the present invention.

As shown in FIG. 6, a pitch sensor 200 consists of two insulating end caps 202 and 204, two outer conductive lengths of tubing 206 and 208, an insulating center coupling 210, a conductive central rod or tube 212 and a conductive fluid 214. Conductive fluid 214 provides a current path between central rod 212 and outer tubes 206 and 208. Tubes 206 and 208 are prevented from electrically contacting each other by a gap or ring 216 in center coupling 210. As pitch sensor 200 orients to mimic the orientation of tool head 28, conductive fluid 214 flows to one end of sensor 200 or the other. A larger conductive path will exist between central rod 212 and whichever outer tube 206 or 208 holds the greater volume of fluid 214. By comparing the conductivities between central rod 212 and outer tubes 206 and 208, the pitch angle of pitch sensor 200 can be determined.

A prototype pitch sensor 200 was constructed from ½-inch cpvc plastic water pipe fittings available from plumbing supply and hardware stores. End caps 202 and 204 were drilled in a lathe to accept central rod 212, a ³⁄₁₆-inch brass tube purchased from a hobby shop. Outer tubes 206 and 208 were short lengths of standard copper water tubing. Conductive fluid 214 was glycerin, with a small quantity of saline solution added to provide for conductivity. Glycerin exhibits a low freezing point and the viscosity necessary for sufficient damping. Prototype pitch sensor 200 was cemented together to prevent leakage of fluid 214. The use of readily available household parts and simple machining allowed prototype pitch sensor 200 to be manufactured at low cost. One of ordinary skill in the art would be able to construct pitch sensor 200 of the present invention.

Figure 7:
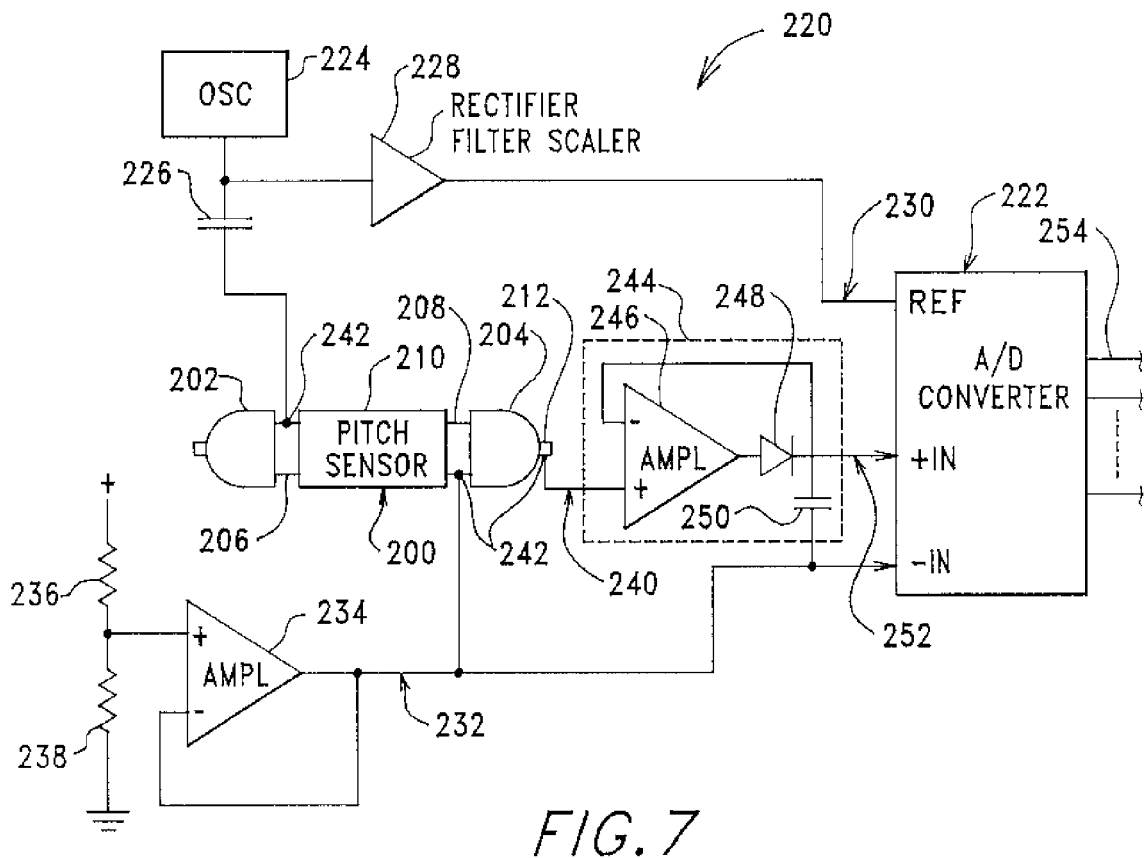
FIG. 7 shows an electronic circuit that is capable of driving a pitch sensor of the present invention.

FIG. 7 shows an electronic circuit 220 capable of driving pitch sensor 200 and providing a digital output. An analog output can also be derived from circuit 220 by eliminating an A/D converter 222. Circuit 220 consists of an oscillator 224 producing an alternating voltage output. Oscillator 224 may produce any convenient alternating voltage output. Outputs ranging from about 50 Hz to about 10 kHz are appropriate for use in the practice of the present invention. For the prototype, the output was a 2 kHz square wave. The output is a.c. coupled to sensor 200 through a capacitor 226. Sensor 200 is preferably driven without any d.c. component to prevent dissociation of conductive fluid 214. Oscillator 224 output is rectified, filtered and scaled by device 228. Output from device 228 is used as a reference voltage 230 for A/D converter 222 to compensate for any changes in oscillator 224 output level.

One outer tube 206 or 208 is coupled to capacitor 226. The other outer tube 208 or 206, respectively, is connected to an analog ground 232, provided by an operational amplifier 234. Analog ground 232 voltage level is sufficiently high that the a.c. peaks remain within the operational range of circuit 220. This voltage level is determined by a resistor pair 236 and 238.

Pitch sensor output 240 is taken from central rod 212 at an electrical connection 242. Output signal 240 amplitude is related to the pitch angle of tool head 28. The exact relationship therebetween is determined by pitch sensor 200 geometry as discussed herein. Output signal 240 is fed into a peak detector 244, including an operational amplifier 246, a diode rectifier 248 and a capacitor 250. A peak detected signal 252, analog ground 232 and reference signal 230 are fed into A/D converter 222 that converts the signals to a digital output 254. Since output signal 254 is referenced to oscillator 224 output voltage, any changes in output signal 254 due to fluctuations in oscillator 224 output voltage will be cancelled.

All of the components of electronic circuits 220 capable of driving pitch sensor 200 are known and commercially available. As a consequence, a practitioner in the art could implement pitch sensor 200 of the present invention.

Figure 8:
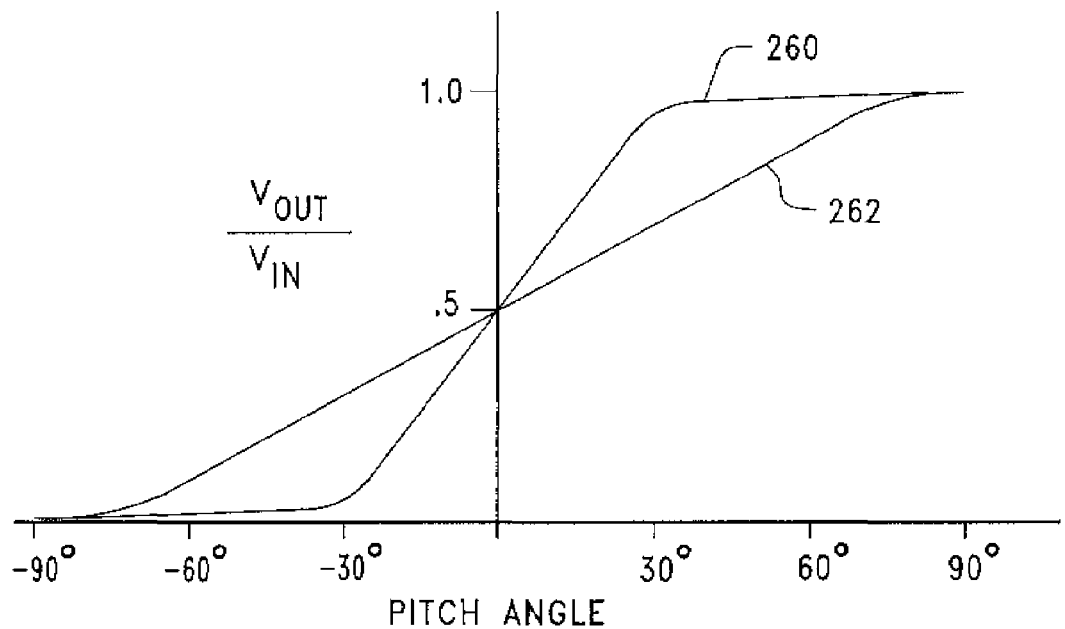
FIG. 8 shows typical pitch response curves that a pitch sensor of the present invention may be designed to emulate.

FIG. 8 shows characteristic output signal 254 curves. For applications where high accuracy over a limited range of pitch is desired, a curve 260 would be preferred. For applications where a broad range of pitch is desired, a curve 262 would be preferred. The variation between curves 260 and 262 is controlled by pitch sensor 200 geometry. Pitch sensors 200 of the present invention may be sized and configured to produce an output signal 254 over the full range of +90 to −90 degrees, if required (e.g., curve 262). Pitch sensors 200 may also be designed to produce its full output signal 254 over an extremely small range (e.g., curve 260).

The alterable geometric parameters are the length-to-diameter ratio of outer tubes 206 and 208, the diameter ratio of central rod 212-to-outer tubes 206 and 208 and the relative level of conductive fluid 214 in pitch sensor 200. A very narrow, highly sensitive pitch resolution may be achieved by broadening the separation between outer tubes 206 and 208 and constructing pitch sensor 200 with a high outer tube 206 and 208 length-to-diameter ratio.

Other pitch sensor 200 characteristics could be achieved through structural alternatives thereof. For example, increasing the amount of fluid 214 in sensor 200 may be undertaken to limit the voltage range.

A well-damped output signal 254 can be obtained using a viscous fluid 214 in sensor 200. Glycerin or a polymer exhibiting the desired elevated viscosity may be used for this purpose. If a nonconductive liquid is used to provide the viscosity, a conductive liquid or a salt must be added to form conductive fluid 214. The required degree of fluid 214 conductivity required depends on the associated electronic circuitry 220. Since output signal 254 is based on a ratio of conductive paths, pitch sensor 200 performance is insensitive to fluid 214 conductivity. As the conductivity increases, the drive current from oscillator 224 or circuit 220 shown in FIG. 7 will increase, however. If low power is desired, then fluid 214 should exhibit low conductivity.

Sensor 200 can be used as an accelerometer, since an acceleration along the axis of central rod 212 will cause fluid 214 displacement in the same manner as a pitch rotation. In an accelerometer application, signal damping assumes greater significance. As a consequence, viscosity of conductive fluid 214 must be carefully adjusted for this application. Baffles, porous foam or other known damping devices may be employed to obtain proper fluid 214 characteristics. Alternatively, fluid 214 may be replaced with conductive balls or other flowing conductive material capable of acceleration-induced displacement in the manner of conductive fluid 214.

Pitch sensor 200 may be plated with gold or another appropriate material to prevent corrosion or reaction between conductive fluid 214 and the internal surfaces of pitch sensor 200. Such plating would greatly extend the life of sensor 200 and provide stability to conductive fluid 214 by preventing additional conductive ions from going into solution.

As demonstrated above, the geometry of and the geometric relationships between pitch sensor 200 components dictate the performance characteristics of pitch sensor 200 of the present invention. A practitioner in the art would therefore be able to design and implement an appropriate pitch sensor 200 for the particular application in which it is to be used.

Although the discussion above is directed to electrically conductive fluid 214, a dielectric fluid or other flowing dielectric medium may also be employed in pitch sensors 200 of the present invention. In the dielectric fluid embodiment of pitch sensor 200, a voltage output is derived from a comparison of the capacitance between outer tubes 206 and 208 and rod 212. A dielectric fluid useful in the present invention is, for example, glycerin, petroleum oils and synthetic fluids. Input impedance should be high, greater than about 10 mega-ohms, for pitch sensors 200 employing dielectric fluids. Since the geometric configuration of pitch sensor 200 components impacts dielectric fluid sensors 200 in substantially the same manner as conductive fluid 214 sensors 200, and the nature and properties of dielectric fluids are known, a practitioner in the art would also be able to design and implement appropriate dielectric pitch sensors 200.

In another device which operates on the same principle, the inner conductive member is not located within the first and second outer conductive members, but is instead located between them. For example, the inner member can be a cylinder of approximately the same dimensions as the outer members and be joined to the outer members by appropriate coupling means. In use, fluid flows from one of the outer members to the other via the inner member, thereby altering the conductance or resistance between the inner member and each of the outer members. These electrical properties can be measured in much the same manner as described earlier.

The operational characteristics of this device can be adjusted by varying the dimensions of the three members, in particular the length/diameter ratios and the separation between the conductive members. Also, the sensitivity of the device can be adjusted by varying the amount of fluid which is placed within the device.

Figure 9:
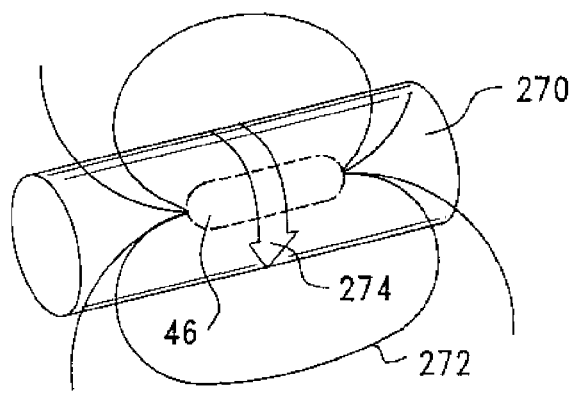
FIG. 9 shows a perspective view of a conductive transmitter housing with a magnetic field transmitting antenna disposed therein.

FIG. 9 shows a configuration of magnetic transmitting antenna 46 contained in a conductive housing 270. A magnetic field 272 derived from antenna 46 induces a voltage in housing 270 that causes electrical current 274 to flow. Current 274 is depicted, for simplicity, as a single line in FIG. 9, but, in actuality, it is a distribution on the surface of housing 270 ascertainable from Maxwell's equations. Surface current 274 induces a counter magnetic field that tends to cancel field 272 derived from antenna 46. As the conductivity of housing 270 decreases, the intensity of current 274 decreases, thereby diminishing the countering field intensity. If a perfect insulating housing 270 were used, no current 274 would flow, and the entire magnetic field 272 induced by antenna 46 would radiate unattenuated. Unfortunately, a conductive metal such as steel produces an amount of current 274 sufficient to virtually eliminate radiated magnetic field 272.

Figure 10:
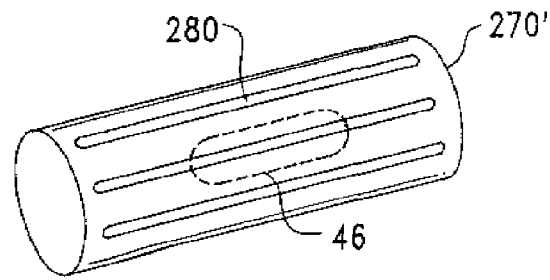
FIG. 10 shows a perspective view of a conductive transmitter housing of the present invention with a magnetic field transmitting antenna disposed therein.

FIG. 10 shows a means of reducing surface current 274 in conductive housing 270 to substantially increase radiated magnetic field 272. The principal difference between housing 270' (FIG. 10) and housing 270 (FIG. 9) is that one or more narrow elongated slots 280 are formed in housing 270'. Slots 280 increase current path length which, because housing 270' is not a perfect conductor, will increase apparent resistance. This increase in resistance, in turn, reduces surface current 274 and the resulting, opposing magnetic field. Alternatively, slots 280 may be replaced by a plurality of elongated apertures of any configuration sufficient to increase current path length.

Slot(s) 280 need only be wide enough to disrupt current 274 flow. Such narrow gap(s) do not readily allow debris penetration and are easily filled to prevent water intrusion. The filler material need only be strong enough to withstand the torque loads on housing 270', or, alternatively, elastic enough to deform in response to those loads and restore to its original shape once the loads have been removed. Since slot(s) 280 are narrow, the filler material is also substantially protected from abrasion caused by the rock and soil material being bored. Composite or ceramic materials could therefore be used as filler materials to restore most of the torsional rigidity and strength to housing 270'.

As stated previously, antennas 46 useful in transmitter 10 of the present invention are known and commercially available. Similarly, slotted housing 270' of the present invention may be fabricated from commercially available steel tubing using known techniques. As a result, a practitioner in the art would be capable of producing and implementing slotted housing 270' of the present invention.

Housing 270 and 270' tests were conducted using steel tubes with inside diameters of approximately 1 inch and 1.25 inch outside diameter. An antenna consisting of a ferrite rod, approximately 0.29 inches in diameter by 1 inch long with windings having an outside diameter of about 0.45 inches, was centrally placed in each tube. Four tubes were tested having zero slots (housing 270), one slot (housing 270'), two slots (housing 270') and four slots (housing 270'). Slots were 0.125 inches wide by 4.5 to 5.5 inches long. Data were taken using a previous receiver of the present invention located 85 inches from the antenna. Table 1 shows the results of this testing. All signal strengths are referenced to an antenna not contained in a housing, representing 100% of the signal generated by the antenna.

TABLE 1

| Signal Configuration Ratio | Orientation | Signal Strength | Strength |
| --- | --- | --- | --- |
| No cover | — | 4.920 | 0.0 dB |
| No slots | — | 0.000 | −Inf. dB |
| 1 slot | 1 | 1.139 | −12.7 dB |
|  | 2 | 1.098 | −13.0 dB |
|  | 3 | 1.060 | −13.3 dB |
|  | 4 | 1.103 | −13.0 dB |
| 2 slots | 1 | 1.945 | −8.1 dB |
|  | 2 | 1.940 | −8.1 dB |
| 4 slots | 1 | 2.835 | −4.8 dB |
|  | 5 | 2.835 | −4.8 dB |

Orientation Notation
1 - Slot toward receiver
2 - Slot perpendicular to receiver (90°)
3 - Slot away from receiver
4 - Slot perpendicular to receiver (−90°)
5 - Slot 45° to receiver The results indicate that the antenna disposed within the housing without slots (housing 270) generated no measurable signal at the receiver. One slot (housing 270') allowed about 22% of the signal to penetrate the housing, with about 0.6 dB variation in signal strength dependent upon orientation. With 2 slots (housing 270'), virtually no variation in the signal strength with orientation was observable, and better than 39% of the signal penetrated the housing. With 4 slots (housing 270'), no variation in signal strength was observed, and more than 57% of the signal penetrated the housing.

Tests with other antennas were conducted to explore other structural/functional relationships involving housing 270' and components disposed therein. If the antenna diameter was increased until it became a large fraction of the inside diameter of housing 270' (approximately 80%), a noticeable loss of Q (i.e., the ratio of stored energy to dissipated energy) in the antenna and a substantial decrease in radiated magnetic field were observed. As a result, the housing diameter is preferably large in comparison to the antenna diameter.

An antenna having a core that was 0.2 inches in diameter by 0.72 inches long and an outer winding diameter of 0.40 inches showed almost identical results for signal strength ratios. This indicates that slot length-to-antenna length ratio is not critical beyond a minimum ratio. The ratio of housing 270' inside diameter-to-antenna diameter does not appear to be critical below a maximum ratio. Preferred embodiments of the present invention employ a housing 270' inside diameter-to-antenna diameter ratio of approximately 2.5 or more. Once these ratios are achieved, the number of slots and the length thereof assumes greater importance. An increase in slot number produces narrower conductor paths, increasing the effective resistance and therefore reducing signal losses. The length of the slots increase the conductive path length and therefore increase the resistance. The number of slots in the cover will be restricted by structural considerations and will vary from one tool design to another. The minimum slot length corresponds to approximately 1.5 antenna lengths.

Figure 11:
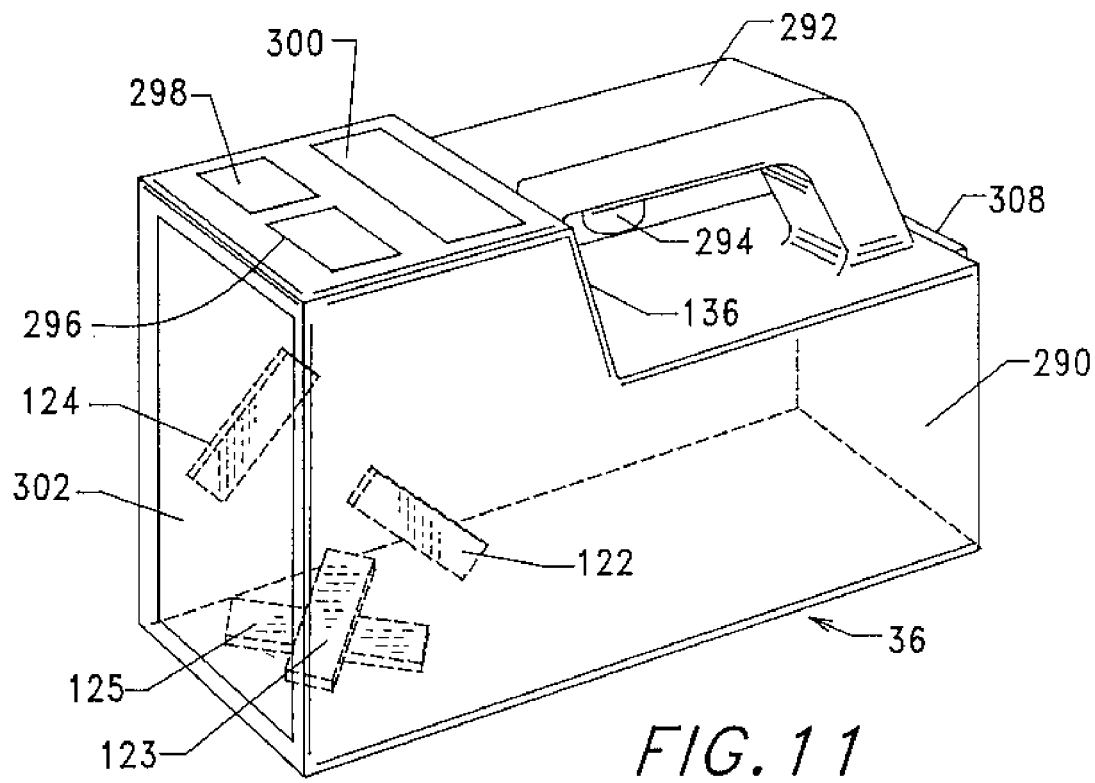
FIG. 11 shows a perspective view of an embodiment of a receiver of the locator/monitor of the present invention.

A preferred receiver 36 of the present invention is shown in FIG. 11. Receiver 36 is preferably a convenient size for portable use. Preferred receiver 36 may, for example, be approximately 1 foot square (X and Y dimensions) by approximately 5 inches wide (Z dimension). A case 290 is formed from a non-magnetic, non-conductive material such as fiberglass or a styrene plastic, such as ABS, so that the magnetic field generated by transmitter 10 is able to penetrate case 290 without attenuation. A handle 292 is provided to allow operator 26 to hold and manipulate receiver 36. A trigger switch 294 provides all control functions for the operation of receiver 36 including power switching, calibration, range compensation and locating functions. Specifically, trigger switch 294 has a variety of settings and/or may be depressed for certain time periods or at specific times during use to initiate specific receiver functions or as a prerequisite to such functions. Displays 296, 298 and 300 provide information to operator 26 regarding range to transmitter 10, transmitter 10 orientation and receiver 36 battery condition. Beeper 136 provides audible cues to facilitate calibration and locating functions as well as to identify errors in procedures or functions. Cover plate 302 provides access to receiver 36 electronics.

Figure 12:
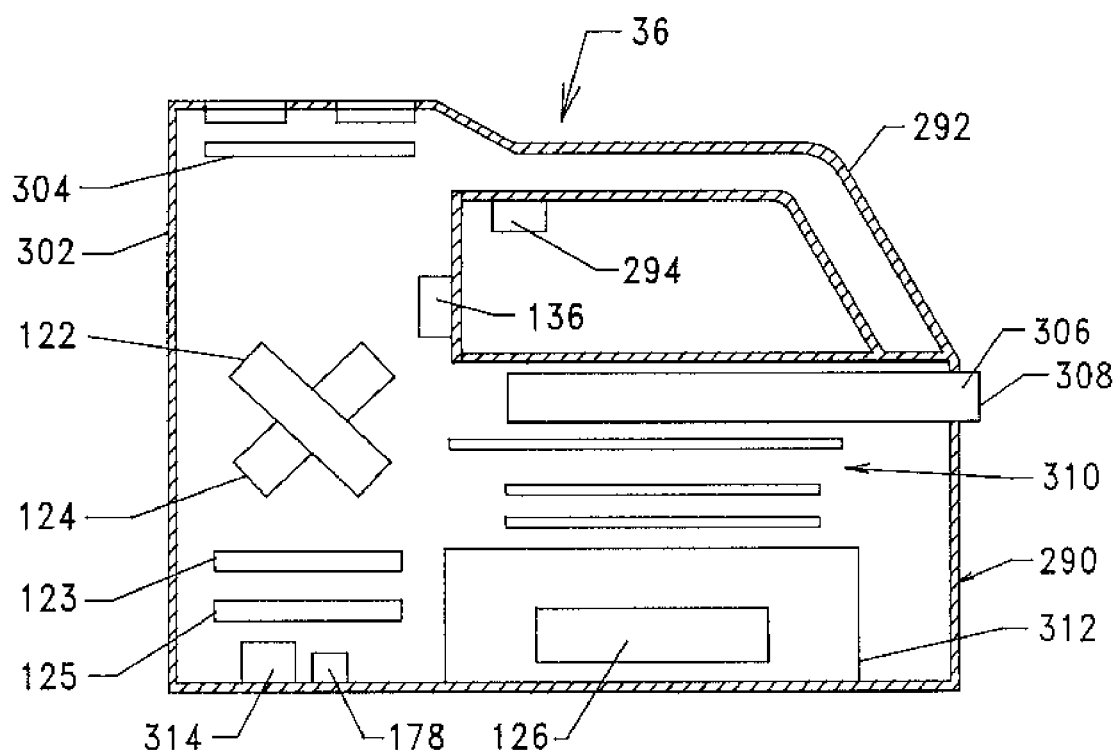
FIG. 12 shows a cross-sectional view of a receiver of an embodiment of the locator/monitor of the present invention shown in FIG. 11.

A cross-sectional view of receiver 36 is shown in FIG. 12. Displays 296, 298 and 300 and associated electronic drives are arranged on a printed circuit card 304. An orthogonal set of antennas 122 and 124 are attached to the side of case 290. Power is supplied by a set of batteries (not shown) loaded into an assembly 306 and held in place by battery cover 308. An additional set of printed circuit cards 310 are arranged above an electronics assembly support 312. Attached to electronics assembly support 312 is roll-pitch receiving antenna 126. Two ultrasonic transducers 314 (i.e., ultrasonic transmitter 186 and ultrasonic receiver 188) are mounted to the bottom of case 290. Temperature sensor 178 is also mounted to the bottom of case 290.

Equipment cases having handles, triggers, displays, battery-containing assemblies and the like are known in the art. Such equipment may be fabricated from known materials and components to achieve a portable apparatus. In addition, the electronic/mechanical interface at trigger switch 294 and electronics relating to displays 296, 298 and 300 are within the purview of a practitioner in the art. As a result, one of ordinary skill in the art could design and implement preferred cases 290 of the present invention.

In operation, the transmitter is installed in the head of a boring tool used to drill a predominately horizontal hole. The transmitter provides an amplitude modulated signal that consists of the carrier frequency (e.g., 32768 Hz) and two tones that are changed four times over a one-second interval followed by a single tone lasting one second used as a delimiter. The tones preferably range in frequency from about 400 to about 900 Hz, for example, so that the entire signal is contained in a bandwidth of less than 2 kHz, for example. Roll-pitch electronics in the receiver of the present invention has a bandwidth of less than 2 kHz, for example, to receive the transmitter signal. The depth receivers have a bandwidth of about 20 Hz, for example, so that roll/pitch modulation does not influence the depth output signal. The depth output signal is a function only of the strength of the received carrier frequency.

The inductor-antenna in the transmitter emits a signal that approximates a dipole field at distances greater than a few antenna coil lengths. The signal strength of a dipole field is known to vary as the inverse cube of the distance. This relationship is used to measure depth and calibrate the system. Since the transmitter has a well regulated power supply and stable components, the transmitted signal remains constant with time so that frequent recalibration is not required.

When necessary or desired, calibration is achieved by first holding the receiver unit near the surface above the transmitter and depressing the switch for approximately 2 seconds, for example. The CPU in the receiver measures the magnetic signal strength of the carrier and uses the ultrasonic system to measure the distance to the surface. The receiver is then raised and the switch again briefly depressed. A second set of magnetic and acoustic measurements are taken. The relationship between the signal strength and the range is then computed by the CPU and the proportionality constant stored. The distance between the receiver and transmitter will be shown on the receiver display in one inch increments. If the operator were to again briefly depress the switch, the receiver would measure the distance to the surface using the ultrasonic ranging system and subtract this value from the magnetic range to obtain the distance of the transmitter below the surface.

An expedited transmitter location process is also provided by the present invention. This process takes advantage of the fact that the orthogonal antenna system measures the total magnetic field strength in the plane of the antennas. When the receiver case (antenna plane) is pointed in a direction parallel to one of the dipole flux lines emanating from the transmitter, the measured field will be a maximum. The operator can therefore hold the receiver at a fixed location above the surface and rotate the case until a minimum distance to the transmitter is indicated. The operator can then move in the indicated direction for a distance related to the indicated distance and repeat the process. Repetition continues until the operator passes over the transmitter, as indicated by an increase in range. The location process must be accomplished in stages, because flux lines are not, in general, straight lines to the transmitter.

The sensitivity of the expedited locating process can be increased by using the square of the signal strength rather than the range which has an inverse cube root relation to the signal strength. Since the square of the signal strength is available from the vector sum process used to obtain the total in-plane signal strength, its use does not add significantly to the computational process. By comparing the current signal strength with the previously measured one, a sensitive signal peak can be determined.

The process consists of arming a beeper activation circuit after several consecutive signal strength increases are measured, indicating a peak searching mode. When the signal ceases to increase or decreases, a brief activation of the beeper occurs. With a measurement cycle time of 0.1 of a second, for example, the indication is quite accurate for moderate rates of signal strength change. In order to enhance the accuracy at faster rates of change, a predictor method may be used to estimate the rate of change of signal strength. If the predictor method determines the peak will occur before the next measurement, the routine measurement cycle is halted, and the beeper is activated after a delay estimated to be that required to reach peak signal.

The predictor may, for example, fit a quadratic function to three prior magnetic field strength readings to determine whether the field strength will pass through a maximum (i.e., zero slope point) prior to the next reading. If the predictor determines that a maximum will occur prior to the next reading, it suspends the next measurement cycle; waits until the estimated time to the maximum passes; and initiates the beeper. The predictor of the present invention is also preferably capable of ascertaining circumstances when extrapolation will not be accurate. Under these conditions, the predictor will not suspend the measurement cycle. If the predictor does not suspend the measurement cycle, and the subsequent measurement is less than the prior measurement, the predictor will initiate the beeper.

A case rotation process is used to determine the direction that the transmitter is pointed once the location of the transmitter has been found. The case rotation process may operate in the same manner as the locator process described above. Specifically, a predictor-controlled extrapolation process may be employed.

The peak signal squared value derived from the searching process may be held in memory. This peak held signal corresponds to the last measured magnetic field strength reading, rather than the extrapolated value. The receiver of the present invention will hold the signal for a specified time period, for example, 2 seconds, to allow the operator the option to further refine the searching process by comparing the current signal strength to the peak value. This is accomplished by the operator, for example, by depressing the switch within the time period for holding the peak signal after the peak signal beep sounds. As long as the switch remains depressed, the receiver will compare the current signal with the peak value and activate the beeper if the current signal strength equals or surpasses the peak held value.

This feature is useful for accurately locating the transmitter. If the operator holds the receiver closer to the surface than it was when the peak beep was heard, there will be an area above the surface where the beeper will sound. As the receiver is raised the area will become smaller. Eventually, a beep will sound at only one location. This process provides a very accurate location. A similar process can be used to establish the pointing direction (i.e., yaw) of the transmitter, replacing lateral and longitudinal displacements with rotation. Specifically, an initial wide angle in which the beeper function is activated will narrow as the receiver is elevated, until the yaw orientation is pinpointed.

The signal strength comparison may also be presented visually using a +/− sign on a display, for example. If the signal strength is increasing, indicating a reduction in range, the − sign is displayed. If the strength is decreasing, indicating an increase in range, the + sign is displayed.

The digital signals received by the roll-pitch receiver and sent to the CPU are decoded and displayed. The roll orientation may, for example, be represented as clock positions in 30 degree increments, 1 through 12. The pitch may, for example, be displayed in degrees from +90 to −90. An indication may additionally be provided when the roll and pitch displays are updated by flashing a sign on the pitch display.

A sign may also be used to indicate that the a receiver should be recalibrated. This determination is established whenever the temperature of the receiver has changed at least 10.degree. C. since the last calibration. Any other appropriate criteria may also be used in making the recalibration determination.

A timer in the CPU determines whether the switch has been activated in the past 5 minutes, for example. If the switch has not been activated within the appropriate time frame, the receiver is switched off. Depressing the switch returns power to the receiver.

The bandwidth values, time constraints, trigger switch activation particulars and the like presented above are exemplary. Other appropriate and substantially equivalent indicators or procedures may be used to accomplish these tasks. A practitioner in the art could produce and implement a receiver case housing with appropriate operational mechanics, electronics and electromechanics.

A procedure for locating the transmitter is based on having the two receiving antennas oriented at a 45 degree angle to level. With this orientation the signal strength in the two antennas will balance at three locations along a line in a vertical plane containing the axis of the transmitting antenna. One location will be approximately above the transmitting antenna, one will be behind the transmitting antenna and one will be ahead of the transmitting antenna. Referring to FIG. 12, if the receiving antennas are moved forward (to the left) along the line starting from a substantial distance from the transmitting antenna, the signal strength would be greater in antenna 124 than in antenna 122 assuming that the transmitting antenna was to the left of the receiving antenna. As the receiving antennas are moved forward (to the left) the signal strength will reach a balance point where the flux line from the transmitting antenna through the receiving antennas is vertical. As the receiving antennas are moved farther toward the transmitting antenna, the signal strength will be greater in antenna 122 until the point where the strengths in both antennas are balanced. At this point, the flux line is horizontal and the receiving antennas are substantially over the transmitter. The exact location of the balance will vary slightly due to the pitch angle of the transmitting antenna. Beyond this mid-balance point, the signal in antenna 124 will be greater until a third balance point is reached when the flux line through the receiving antennas is again vertical. Beyond this fore-balance point, the signal strength will again be greater in antenna 122.

By noting the transition of greater signal strength between antennas 122 and 124 at the balance point, it is possible to distinguish the point substantially over the transmitting antenna from the other two points of balance. That is, there is only one transition of greater signal strength from antenna 122 to antenna 124 while there are two transitions from 124 to 122.

The two locations where greater signal strength transitions from antenna 124 to antenna 122 can be used to provide two lateral locates which are in planes perpendicular to the axis of the transmitting antenna, one ahead and one behind. This locating procedure indicates the lateral position and direction of the transmitter. At these two balance points, the magnetic flux lines from the transmitting antenna extend in a radial direction along a circle passing through the receiving antennas contained in the planes which are substantially perpendicular to the axis of the transmitter. If the receiving antennas are rotated about a vertical axis such that the receiving antennas axes are in the same plane as the radial flux line, then another signal strength balance point can be found. This point will be on the line formed by the intersection of the vertical plane through the transmitting antenna and the plane of the radial flux lines. A mark or flag can be placed on the surface of the ground directly below the point. A corresponding point can also be found on the other end of the transmitting antenna and the surface of the ground marked accordingly. The line connecting the two points will be in the vertical plane containing the axis of the transmitter and therefore provide the lateral locate. Then the balance point at the transition of greater signal strength from antenna 122 to antenna 124 as the receiver is moved forward along the line will provide a location substantially over the center of the transmitting antenna.

An important feature of the procedure just outlined for the lateral locate is the use of the vertical component of the flux field to obtain a balance when the plane of the receiving antenna is perpendicular to the axis of the transmitting antenna. This means that any point behind or ahead of the balance point substantially above the transmitting antenna could be used since the flux lines at any other location except substantially over the transmitting antenna would have a vertical component. Although the best sensitivity will be obtained by using the fore and aft balance points, the procedure will work without having to find these points.

In practice, acceptable lateral locates have been obtained by first finding the mid-balance point above the transmitting antenna, then marking the location by having the locating operator place their foot on the ground below the receiving unit and then pivoting on that foot so as to be able to move the receiver perpendicular to the axis of the transmitter within normal reach ahead or behind the marked location.

A similar locating process can be accomplished employing only one horizontal receiving antenna. With the single antenna configuration, the locations where the flux lines are substantially vertical would cause a null signal in the receiving antenna, and the location substantially over the transmitting antenna would cause a maximum or peak in the induced signal strength in the receiving antenna. One difference between the single-antenna and the dual-antennas locating methods is that with the single-antenna method there is no indication as to the direction to move to find the null or maximum such as the relative signal strength described above.

In practice, a "+" and "−" symbol have been used on the receiver's display to denote which receiving antenna has the greater induced signal strength. If antenna 124 has the greater signal strength, a "+" is displayed, and if antenna 122 has the greater signal strength, a "−" is displayed. Moving the receiver forward toward the transmitting antenna from a great distance, the display will first show a "+" then switch to a "−" at the aft balance point where the flux line is substantially vertical. Moving on in the same direction, the display will then transition to a "+" at the balance point substantially over the transmitting antenna where the flux line is level. Moving on farther, the display will finally transition to a "−" at the fore balance point where the flux line is again substantially vertical. By finding "−" to "+" transition, the balance point substantially over the transmitting antenna can be distinguished from the other two balance points which will be "+" to "−" transitions.

The complete locating procedure using the fore and aft signal balance points have been found to provide very good accuracy not only for the location of the transmitting antenna but also for the direction that the antenna is pointing.

A receiver as is described in this application can also be used to identify and measure the angular and horizontal displacement of a transmitter. When used for this purpose, the orthogonally oriented antennas are in a horizontal plane. The two antennas detect the signal from the transmitter which is horizontally displaced from the receiver and at a distance from the receiver. For example, the receiver may be located at a position to which a boring tool is directed. The boring tool can be started towards the location of the receiver from a location at a distance from the receiver. As the boring device progresses towards the receiver, the receiver can detect when the flux line from the transmitting antenna through the receiving antennas are deflected so as not to cause equal signals to be induced. Such a deflection can be caused by an angular deflection, a lateral deflection or a combination of both.

When the boring device is angularly and/or laterally displaced from a direct flux line path towards the receiver, one of the two orthogonally oriented antennas will detect a stronger signal than the other antenna and this will be indicative of the direction in which the boring device must be steered. An appropriate visual indication can be given to the operator as to which of the two antennas is receiving the greater signal and thus the direction to which the boring device must be steered. This enables the operator to correct the direction of the boring device's progress.

Optionally, the CPU can calculate the displacement of the boring tool from a flux line heading to the receiver as a function of the ratio between the signal strengths measured by the two antennas. This information can be useful in helping the operator to determine the degree of correction which is required. It is also possible to reduce or eliminate the need for an operator by providing an appropriate connection between the receiving unit and the boring control device. When the receiver senses that the boring tool is displaced from a flux line course to the receiver, it can transmit to the boring control device an indication of the direction and, optionally, the magnitude of the error. In response to this input, the boring control device can automatically adjust the direction in which the boring tool moves in order to bring the tool back into a flux line path towards the receiver.

In yet another version of such a control device, the receiver includes two pairs of receiving antennas, the antennas in each pair being orthogonally oriented to each other, with one pair in a horizontal plane and the other pair in a vertical plane. The antenna pair in the horizontal plane functions to provide an indication of the displacement of the boring tool as described above, and the vertically oriented pair provides an indication of the vertical displacement of the boring tool in a similar manner. Such a device can provide simple, reliable and automatic control progress of a boring tool.

Referring again to FIG. 1a, certain characteristics of the locating field are pertinent to the discussion which follows. Several of these characteristics are described in U.S. Pat. Nos. 5,155,442, 5,337,002, 5,444,382 and 5,633,589 (collectively referred to herein as the "Mercer Patents"), all of which are incorporated herein by reference. One of these characteristics is seen in FIG. 1a as nulls 14 in the locating field, as described above for a single horizontal antenna. Outside the null points, a local peak in signal strength which may be referred to as a "ghost" is present. As described in the Mercer patents, the locating field is vertically oriented at these null points such that a single horizontally oriented antenna loses the locating signal. These null points, sometimes referred to in the Mercer patents as negative locate points, may also be referred to more simply as locate points herein. In particular, the locate point which is ahead of the boring tool may be referred to as a forward locate point (FLP) and the locate point which is behind or to the rear of the boring tool may be referred to as a rear locate point (RLP). For present purposes, it is sufficient to note that the locate points arise as a result of the use of an elongated electromagnetic radiation dipole transmitter in the boring tool used to produce the locating signal, as described in the Mercer Patents.

Figure 13:
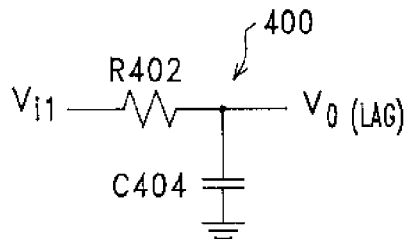
FIG. 13 is a schematic diagram illustrating a lag circuit.

Referring to FIG. 13 and the prior discussions regarding the vector sum of components of a locating signal, further advances in this subject are described. FIG. 13 illustrates a lag circuit generally indicated by reference number 400. Circuit 400 includes a resistor R402 and a capacitor R404 in a series connection. An input voltage $v_{i1}$ is provided. The output of the circuit is $v_{o(lag)}$. It can be shown that:

$$v_{o(lag)} = \frac{v_{i1}}{\sqrt{2}} e^{-j\frac{\pi}{4}} \tag{6}$$

Figure 14:
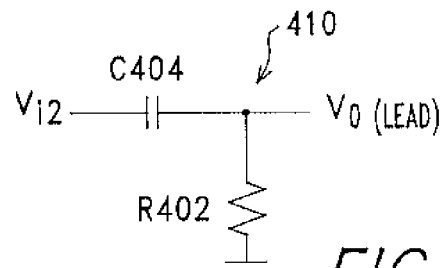
FIG. 14 is a schematic diagram illustrating a lead circuit.

Referring to FIG. 14, a lead circuit 410 includes R402 and C404 interchanged in position relative to FIG. 13 and with an input voltage $v_{i2}$ and an output voltage $v_{o(lead)}$. For circuit 410, it can be shown that:

$$v_{o(lead)} = \frac{v_{i2}}{\sqrt{2}} e^{j\frac{\pi}{4}} \tag{7}$$

Figure 15:
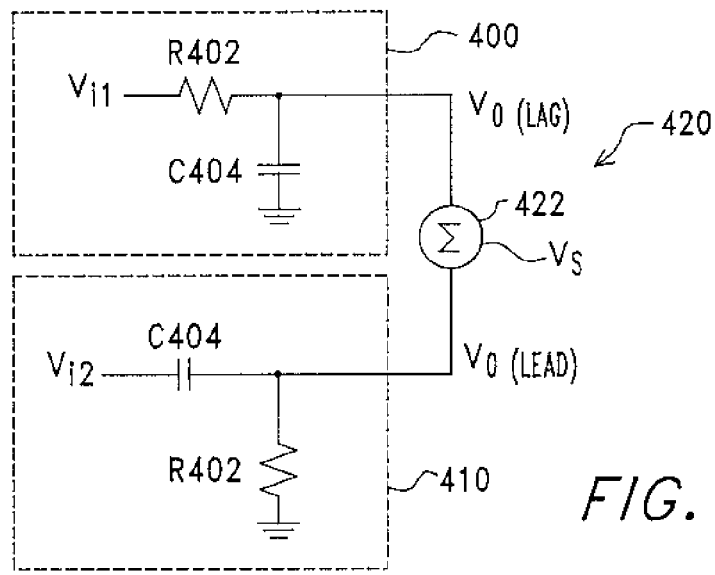
FIG. 15 is a schematic diagram illustrating a summing circuit incorporating the lag and lead circuits of FIGS. 13 and 14, respectively, wherein the lag circuit receives an input $v_{i1}$ and the lead circuit receives an input $v_{i2}$.

FIG. 15 illustrates a summing circuit 420, which is a combination of previously described lag circuit 400 and lead circuit 410, each of which are indicated within dashed lines, along with summing junction 422. Summing junction 422 receives $v_{o(lag)}$ and $v_{o(lead)}$ to produce a sum voltage $v_s$. Using equations 6 and 7:

$$v_s = \frac{v_{i1}}{\sqrt{2}} e^{-j\frac{\pi}{4}} + \frac{v_{i2}}{\sqrt{2}} e^{j\frac{\pi}{4}} \tag{8}$$

Figure 16:
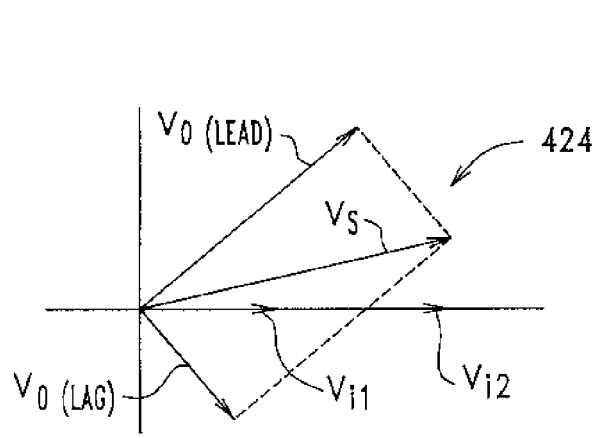
FIG. 16 is a vector diagram illustrating a sum of $v_{i1}$ and $v_{i2}$ performed by the summing circuit of FIG. 15 when $v_{i1}$ and $v_{i2}$ are in phase.
Figure 17:
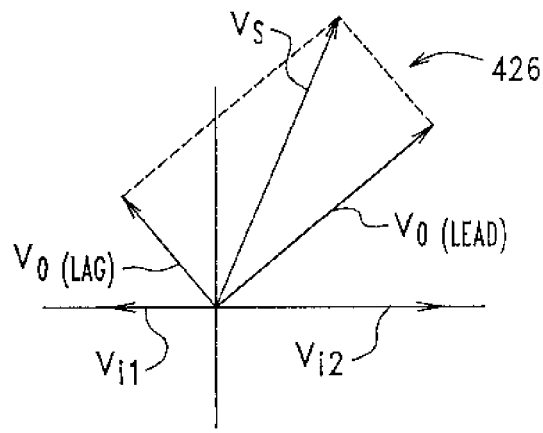
FIG. 17 is a vector diagram illustrating a sum of $v_{i1}$ and $v_{i2}$ performed by the summing circuit of FIG. 15 when $v_{i1}$ and $v_{i2}$ are 180° out of phase.

Referring to FIGS. 16 and 17, if $v_{i1}$ and $v_{i2}$ are in phase or 180° out of phase, $v_s$ is the vector sum of $v_{i1}$ and $v_{i2}$. FIG. 16 illustrates an in phase vector sum 424 while FIG. 17 illustrates a 180° out of phase vector sum 426. The magnitude of $v_s$ is the same irrespective of $v_{i1}$ and $V_{i2}$ being in phase or 180° out of phase; however, the phase angle of the vector sum varies with respect to $v_{i1}$ and $v_{i2}$.

Referring to FIG. 18, a first embodiment of a vector sum receiving circuit 450, manufactured in accordance with the present invention, is generally indicated by the reference number 450, which includes previously described lag circuit 400 and lead circuit 410. A pair of orthogonally arranged antennas 452 includes antennas 452a and 452b. These antennas are shown in a vertical and a horizontal orientation, respectively, for illustrative purposes. One useful implementation for providing orthogonal antennas having centered radiation patterns is disclosed in U.S. Pat. No. 6,005,532 entitled ORTHOGONAL ANTENNA ARRANGEMENT AND METHOD which is incorporated herein by reference and which is commonly assigned with the present application. The overall orientation of the antenna pair can be varied in any suitable manner such as, for example, by placing the antennas in an "X" configuration with respect to horizontal and vertical. The dipole locating signal to be received is indicated as $Be^{j\omega t}$ and is oriented at angle θ to horizontal. Horizontal antenna 452a provides a signal $s_1$, serving as a first component of the locating signal, to an amplifier 454a. The amplified first component is then sent to lag circuit 400 to produce $V_{o(lag)}$ which is then provided to a summing amplifier 456, forming part of a summing amplifier section 457, via a DC blocking capacitor C458a and a series resistor R460a. Vertically oriented antenna 452b provides a signal $s_2$, serving as an orthogonal, second component of the locating signal, to an amplifier 454a. The amplified second component is then sent to lead circuit 410 to produce $V_{o(lead)}$ which is then provided to a summing amplifier 456 via a DC blocking capacitor C458b and a series resistor R460b. Series resistors R460a and R460b each have a value $R_s$. A feedback resistor R462 cooperates with series resistors R460 to set the gain of summing amplifier 456. The value of R462 is set to $\sqrt{2}R_s$ so as to provide a summing amplifier gain of $\sqrt{2}$ for reasons to become evident. Also, the product of C404 and R402 is set to $$\frac{1}{\omega}.$$

With the input of the locating signal taken as $Be^{j\omega t}$:

$$s1 = Be^{j\omega t}\cos\theta \text{(horizontal antenna), and} \quad (10)$$

$$s2 = Be^{j\omega t}\sin\theta \text{(vertical antenna).} \quad (11)$$

$V_{sum}$, the output of summing amplifier 456 is equal to the sum of the amplified and phase shifted s1 and s2 components of the locating signal multiplied by $\sqrt{2}$:

$$v_{sum} = \sqrt{2}\left[\frac{Be^{j\omega t}\cos\theta}{\sqrt{2}}e^{-j\frac{\pi}{4}} + \frac{Be^{j\omega t}\sin\theta}{\sqrt{2}}e^{j\frac{\pi}{4}}\right] \quad (12)$$

This expression can be reduced to:

$$v_{sum} = Be^{j(\omega t + \theta - \frac{\pi}{4})} \quad (13)$$

which is equal to the total locating field, as described above. Thus, the orthogonally measured components of the locating field have been used to produce a true vector sum.

Referring to FIGS. 5A and 18, vector sum receiving circuit 450 is advantageous since only a single receiving circuit is required to detect the vector sum of the magnetic field. As can be seen in FIG. 5A, separate range receivers 122 and 124 are each associated with one of the antennas in receiver 36. Alternatively, vector sum receiving circuit 450 may be used in receiver 36 so as to eliminate the need for one range receiver. This improvement serves to simplify the circuitry with an attendant increase in reliability. At the same time, the single receiver vector sum circuit does not allow for detecting the locate points described above. This may be offset, however, since there are drilling applications which are particularly well suited to locating without the use of the locate points. One such application, for example, is that of locating to a shallow bore. Shallow bore drilling is promi-nent in certain instances including installing utility services from a curb to a residence. The advantage of the vector sum receiving circuit, in this instance, resides in the elimination of the aforementioned ghosts, seen in FIG. 1a and described above. This advantage is provided since the vector sum exhibits a monotonic variation in signal strength (see FIG. 1b), even though a single receiving circuit is employed.

Referring to FIG. 5A, the vector sum receiving circuit is advantageous in roll-pitch receiver 126 since receiving circuit 450 eliminates nulls in the signal strength introduced by a single antenna configuration. That is, at a null point, the roll and pitch information cannot be received when a single horizontal antenna is used. Of course, use of the vector sum receiving circuit assumes the use of a pair of input antennas. These antennas can be shared for both the range and roll-pitch receivers by connecting both receivers to the $v_{sum}$ output of amplifier section 457. In addition, the circuit shown in FIG. 17 may be used solely for the roll-pitch receiver to eliminate the null while connecting the same two antennas to the two depth receivers as previously described.

Referring to FIGS. 18 and 19, vector sum receiving circuit 450 is partially illustrated in an embodiment which does not require the use of active components. To that end, summing amplifier section 457 has been replaced by a tuned LC tank circuit 464 including resistors R460a and R460b connected to the LC tank circuit at a node 470. The opposing end of the tank circuit is connected to ground. In addition, amplifiers 454a and 454b are eliminated (not shown) such that antenna 452a is connected directly to R402 of lag circuit 400 and antenna 452b is connected directly to C404 of lead circuit 410. In this configuration, the impedance of antennas R452a and R452b must be low enough to drive the required network or buffer amplifiers (not shown). Consideration must also be given to the drive requirements of a receiver (not shown) which accepts $v_{sum}$ from the vector sum circuit in this tank circuit configuration. That is, for the summing circuit to function properly, the input impedance of any receiver receiving $v_{sum}$ from this tank circuit configuration must be high compared to $R_s$ or the equivalent parallel dissipation resistance of the tank, whichever is greater. Otherwise, the Q of the tank will be reduced and the attenuation of the signal will be increased.

Figure 20:
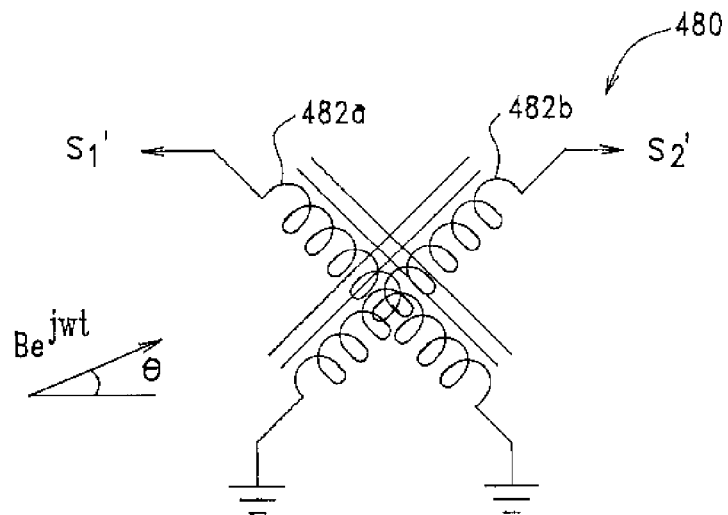
FIG. 20 is a diagrammatic illustration of a planer orthogonal antenna arrangement in an "X" configuration for receiving a locating signal assuming the surface of the ground as being horizontal in the figure.

FIG. 20 illustrates planer orthogonal antenna arrangement 480 that may also be referred to as an "X" antenna configuration for purposes of simplicity. Thus, the first and second antennas for range receivers 122 and 124, respectively, of FIG. 12 may be replaced by X configuration 480 and accompanying circuitry.

Still referring to FIG. 20, X antenna configuration 480 includes orthogonal antennas 482a and 482b. Antenna 482a produces an output signal $s_1'$ while antenna 482b produces an output signal $s_2'$ from the locating signal. For an input locating signal given as $Be^{j\omega t}$ and oriented at an angle θ to horizontal, $s_1'$ and $S_2'$ are given as:

$$s_1' = -Be^{j\omega t}\cos(\pi/4+\theta), \text{ and} \quad (14)$$

$$s_2' = Be^{j\omega t}\cos(\pi/4-\theta). \quad (15)$$

The sum of $s_1'$ and $S_2'$ is expressed in the following equation:

$$s_1' + s_2' = Be^{j\omega t}[-\cos(\pi/4+\theta)+\cos(\pi/4-\theta)]. \quad (16)$$

Expanding the expression and canceling terms leaves:

$$s_1' + s_2' = 2Be^{j\omega t}\sin\pi/4\sin\theta, \text{ or} \quad (17)$$

$$s_1' + s_2' = \sqrt{2}Be^{j\omega t}\sin\theta. \quad (18)$$

Referring to FIGS. 18 and 20, comparison of equations 11 and 18 reveals that the sum of $s_1'$ and $s_2'$ is equivalent to the output of a vertically oriented antenna having a gain of $\sqrt{2}$. In essence, the sum signal represents the output of an "electronically rotated" vertical antenna.

The difference between $s_1'$ and $s_2'$ is expressed in the following equation:

$$s_1'-s_2'=Be^{j\omega t}[-cos(\pi/4+\theta)-cos(\pi/4-\theta)] \quad (19)$$

expanding and canceling terms leads to:

$$s_1'-s_2'=-2Be^{j\omega t} cos\pi/4 \, cos\theta, \text{ or} \quad (20)$$

$$s_1'-s_2'=-\sqrt{2}Be^{j\omega t} cos\theta. \quad (21)$$

A comparison of equations 10 and 21 shows that the difference signal is equivalent to the output of a horizontally oriented antenna having a gain of $-\sqrt{2}$. Thus, the sum signal represents the output of an electronically rotated horizontal antenna. The use of the sum and difference signals forms an integral part of the techniques to be described below. While the use of signals provided by electronic rotation is considered to be highly advantageous, the use of first and second signals measured along first and second intersecting receiving axes in an initial orientation defining an antenna plane in combination with third and fourth signals, that may be produced in one way by an actual physical rotation of the receiving axes by a predetermined amount such as, for example, 45° about the intersection point within the receiving plane, is considered to be within the scope of the appended claims. That is, the third and fourth signals may be produced in any suitable manner for use in the methods that follow, including the highly advantageous electronic rotation method described immediately above. Moreover, the use of a rotated antenna arrangement allows for the determination of the slope of the magnetic field lines within a 180° ambiguity using a pair of range receivers that detect only peak or average signal strength and not the phase relationship as would be otherwise required. This rotation technique allows for more simple receivers to be employed.

Figure 21:
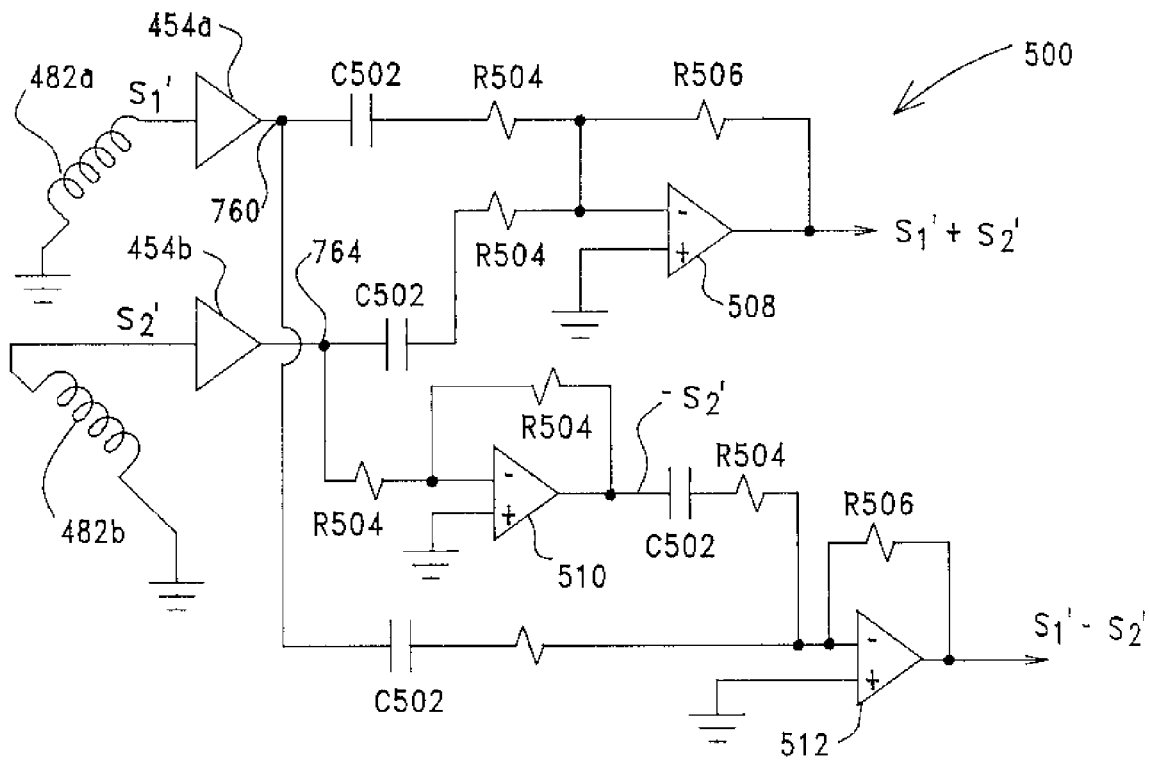
FIG. 21 is a schematic diagram illustrating one embodiment of a sum and difference generating circuit designed in accordance with the present invention for use in generating output signals which may otherwise be obtained from horizontal and vertical antennas having receiving patterns centered at the center point of the X antenna configuration of FIG. 20.

Referring to FIG. 21, circuit 500 is an embodiment of a sum and difference generating circuit designed in accordance with the present invention. Capacitors C502 all serve the purpose of DC blocking. Resistors R504 are all of the value $R_s$ while resistors R506 have a value of $\sqrt{2}R_s$. Buffers 454a and 454b receive $s_1'$ and $s_2'$ from orthogonal antennas 482a and 482b (so as to present a high input impedance to the high output impedance of the antennas) and have a gain G. A first amplifier 508 with its biasing resistors is configured to provide a gain of $1/\sqrt{2}$ such that the output of the amplifier is the sum signal G $(s_1'+s_2')/\sqrt{2}$. A second amplifier 510 receives $s_2'$ at its inverting input. The amplifier cooperates with its biasing resistors as an inverter to provide a gain of –1 such that the output is $-s_2'$. By setting the gain of the amplifiers with R506 and R504 to be $1/\sqrt{2}$, the vector sum signal strength from the rotated antennas is equivalent to the vector sum signal strength of the output of the buffers 454a and 454b, that is the product of G multiplied by B.

Still referring to FIG. 21, the output, $-S_2'$, of amplifier 510 is provided to a third amplifier 512 and its biasing resistors via one of resistors R504. Amplifier 512 cooperates with its biasing resistors to provide a gain of $1/\sqrt{2}$ such that the output of this amplifier is the difference signal G, $(s_1'-s_2')/\sqrt{2}$. Thus, circuit 500 has produced the sum and difference signals contemplated above and equivalent to those signals which could otherwise be generated by a vertical antenna and a horizontal antenna, respectively, when the actual antennas measuring $s_1'$ and $S_2'$ are in an X configuration with respect to horizontal. In this manner, four field measurement values are available rather than only two, even though the need to physically measure two of the values has been advantageously eliminated. Although it might appear to be a simple matter to merely add another pair of orthogonal antennas in the + configuration to measure the third and fourth signals, the task is complicated by a number of factors, including space limitations, undesirable weight increase, and the need to have substantially common centers for the various antennas in order to provide optimum accuracy. A highly advantageous solution for this difficult antenna centering problem is been disclosed in the above incorporated U.S. Pat. No. 6,005,532. At the same time, it is to be understood that the methods below may be practiced using four separate antennas oriented appropriately irrespective of the fact that overall accuracy may be affected.

The advantages derived from using four magnetic field values derived, for example, using circuit 500 (FIG. 21), as described above, are made clear in FIG. 22 which illustrates boring tool 28 transmitting a dipole locating signal in a region 448 from an internal transmitter (not shown) producing a dipole field 550. Four selected flux lines of dipole field 550 are shown as indicated by the reference numbers 552, 554, 556 and 558 and are distorted from their true representation for purposes of illustration only. In this regard and in accordance with the present invention, the depicted flux lines have been selected based on their slope in the vicinity of ground surface 560 (only partially shown), which is parallel to and below the line of travel of the locating antennas. The boring tool is depicted traveling in a forward direction as indicated by an arrow 562, and angular measurements are taken herein with respect to the forward direction. Specifically, flux line 552 is horizontally oriented at the surface at a point A directly above boring tool 28. Flux line 554 is oriented at an angle of 135° from horizontal at a point B measured clockwise (CW) from the forward direction at the locator above the surface of the ground. Point B is also ahead of the boring tool with respect to forward direction 562. A mirror image of the entire flux field ahead of the boring tool is present behind the boring tool, assuming ground surface 560 is level and boring tool 28 is also horizontally oriented. Therefore, at a point B', which is behind the boring tool, flux line 554 is oriented at 45° from horizontal measured CW from the forward direction (note the flux angles may just as readily be specified in other ways such as, for example, measurement CCW from the forward direction. In this instance, 45° is added to the angular measurements described per the adopted conventions currently used with regard to FIG. 22). At a point C, flux line 556 is oriented vertically. Similarly, a vertical flux orientation is present at point C' behind the boring tool on flux line 556. C is the forward locate point and C' is the rear locate point.

Still referring to FIG. 22, at a point D on the surface of the ground at flux line 558, the flux line has a slope orientation of 45° from horizontal measured CW from the forward direction. At D' on flux line 558, a flux slope orientation of 135' is encountered measured CW from the forward direction. At points E and E', which represent an infinite distance from the boring tool, the flux line slope theoretically approaches horizontal.

Points A-E and B'-E' serve to define a series of regions which are numbered as regions 0-7. Within each of these regions, a predetermined flux line slope orientation is present, depending upon the flux line orientations at the points which define the boundaries of the regions at the surface of the ground. FIG. 22 indicates the range of flux line slope within each of regions 0-7. As the slopes of the flux lines are measured in a clockwise direction with respect to forward direction 562, region 0 (points E-D) includes a flux slope ranging from 0° (horizontal) to 45°; region 1 (points D-C) includes a flux slope ranging from 45° to 90°; region 2 (points C-B) includes a flux slope ranging from 90° to 135°; and region 3 (points B-A) includes a flux slope ranging from 135° to horizontal or 180°. These regions do not include the defining boundary points such that the flux slope within each region ranges up to, but does not include the flux slope at the defining boundary points. For reasons which are made evident below, flux orientation characteristics a-d have been assigned to regions 0-3, respectively.

Continuing in a progression through regions 0-7 of FIG. 22, after having passed above boring tool 28, region 4 (points A-B') includes a flux orientation slope ranging from 180° to 225° measured CW from the forward direction, which is the same range of flux slope orientation in region 0, except for the addition of 180°. Because the magnetic field continuously oscillates, the slope will switch 180° during each complete oscillation cycle. For example, a flux line that has a slope of 45° will have a slope of 225° one-half cycle later. An upper row of values for flux slope in regions 5 through 7 shows the slopes of the flux lines in dipole field 550 together considering the full range (i.e., 0° to 360°) of possible flux orientation across regions 0-7. In parentheses, angular ranges are shown for regions 5-7 which indicate corresponding ranges over a 0° to 180° range, not attempting to account for the 180° angular ambiguity. Region 4 has been assigned flux orientation characteristic a. In continuing through regions 5, 6 and 7, region 5 exhibits flux orientation characteristic b, as with region 1; region 6 exhibits flux orientation characteristic c, as with region 2; and region 7 exhibits flux orientation characteristic d, as with region 3. Because a pair of regions shares one of the flux orientation characteristics, use of the flux orientation characteristic of the locating field at any one point above the path (or intended path) of the boring tool is ambiguous. For example, if flux orientation characteristic c is detected at a particular above ground location, that location may be in either region 2 or region 6, since both of these regions exhibit flux orientation characteristic c. With regard to the boundary points which define these regions, the same ambiguity also exists. For example, the same flux line slope is present at point D as is present at point B'. Similarly, the same slope is present at the pairs of points C-C' and B-D'. Therefore, the present invention provides a number of approaches for resolving this ambiguity discussed below.

Still referring to FIG. 22, one method of dealing with the ambiguity of the flux slope resides in identification of balance points, as can best be explained by referring to the balance signals produced by the "X" configuration (see FIG. 20) of the antennas at specific locations above ground. The balance points of signal strength will occur at three different above ground locations for most locating situations. Assuming that the locating signal transmitter is level (as shown in FIG. 22), that the receiver is moved along above ground surface 560, and that the ground above and in the vicinity of the transmitter is level, one balance point is located at A, which is substantially above the boring tool transmitter. The other two balance points are the aforementioned forward located point (FLP) and rear locate point (RLP), which are located at point C and point C', respectively. To resolve whether the receiver is at one of the locate points or at the overhead point, one method uses actual physical rotation of the antenna pair. Another method, as described above, uses electronic rotation. In the former method, the X antenna configuration can be rotated by 45° degrees about the intersection point of the orthogonal antennas with the receiving plane defined by the antennas continuing to extend generally along the intended path of the boring tool. However, the electronic rotation method is considered to be highly advantageous. Therefore, its use is discussed below even though equivalent signals obtained in other techniques may also be used.

Continuing with a discussion relating to resolving the flux slope ambiguity seen in FIG. 22, if the X configuration antenna arrangement is at point A above the boring tool transmitter, electronic rotation of the antennas will yield a horizontal antenna signal receiving the entirety of the signal strength at point A while the vertical antenna signal will exhibit a null. In contrast, at the forward and rear locate points, C and C', respectively, this signal pattern will be reversed, and the vertical antenna signal will receive the entire signal strength of the locating signal while the horizontal antenna signal will receive none and show a null. Therefore, the balance points are divisible into two different types for an "X" antenna: 1) at the overhead point A, and 2) at the FLP and RLP. In theory, two additional balance points of the first type exist at points E and E', which are at an infinite distance from the boring tool transmitter. However, because the signal strength of the locating signal is so low at E and E', these points are of no practical consequence to the present discussion. Thus, by switching the antenna rotation circuit in and out of the overall circuitry in a portable locator to obtain four relative values of the locating signal, the ambiguity as to type of balance point at which the receiver is positioned may be resolved. However, because the flux appears the same at both the FLP and the RLP, there still remains an additional ambiguity that must be resolved in order to determine the position of the receiver relative to the transmitter.

Referring to FIG. 2, this ambiguity can be resolved based on the absolute phase of the transmitted locating signal relative to the received signal. The absolute phase can be determined by using an arrangement which sends out phase information regarding the locating signal to the above ground receiver/locator. One approach is to transmit the locating signal through drill pipe 564 using an induced signal on the pipe or by means of a separate wire within the pipe. See, for example, U.S. patent application Ser. No. 09/317,308, filed Jun. 1, 1999, entitled AUTO-EXTENDING/RETRACTING ELECTRICALLY ISOLATED CONDUCTORS IN A SEGMENTED DRILL STRING, which is incorporated herein by reference and which discloses a number of highly advantageous "wire in the pipe" arrangements. The signal transmitted through the pipe to the drill rig is encoded or used to modulate a radio frequency (RF), audio, ultrasonic or infrared signal (IR) that is sent to the receiver. In some cases, the signal could also be sent to the receiver using a direct connection such as a conductive wire or fiber optic line. In the present example, FIG. 2 illustrates a tripod 600 supporting a transmitter 602 which is connected with the drill rig via a cable 603 to receive the wire in the pipe data. Transmitter 602 transmits a phase signal 604 to locator 36. The latter is configured with a phase receiver 608 for receiving phase signal 604. Receiver/locator 36 then compares phase signal 604 with the phase of the locating signal being received directly from the boring tool transmitter to obtain an absolute phase of the received locating signal. In one implementation, the phase signal may simply be in the form of a multiplication factor of +1 or −1. That is, with one multiplication factor and a particular instantaneous locating field polarity, the locator is at the FLP while the presence of the opposite multiplication factor with the same instantaneous locating field polarity indicates that the locator is at the RLP. This arrangement functions to indicate whether the locator is ahead of or behind the boring tool with respect to forward direction 562 at any position of the locator above the intended path of the boring tool.

Referring again to FIG. 22, the field slope detection capability of the present invention, in and by itself, provides valuable information regarding the location of the boring tool even lacking absolute phase determination as described above. That is, the field slope detection capabilities of the present invention serve to direct an operator to the locate points C and C' and/or to the overhead point A using a number techniques to be described.

Still referring to FIG. 22, a first flux orientation locating technique in accordance with the present invention, relies on the use of regions 0-7 in conjunction with the aforedescribed four orientation characteristics of the locating signal. These characteristics may be obtained using an X antenna configuration to directly measure two of the values and then generate the other two values equivalent to a + antenna configuration. In this regard, it is recognized that regions 0 through 7 occur in a predetermined sequence along the intended path of the boring tool. As described above, one of four specific flux orientation characteristics a-d occur in each of the regions as shown in FIG. 22. In approaching the boring tool, for example, from some point in region 0, traveling in forward direction 562, an operator carrying locator 36 (not shown) will pass through a portion of region 0 and then successively pass through regions 1 through 3. In doing so, flux orientation characteristics a-d, will be observed prior to arriving at point A, substantially above the boring tool. Should the operator continue in the forward direction, the flux orientation characteristics will repeat in passing through regions 4 through 7. So long as the operator successively tracks the flux orientation while progressing along the path, a repetition of the flux orientation characteristics is an indication to the operator that the locator has passed over and is now ahead of the boring tool thereby avoiding any problem resulting from repetition of the flux orientation regions on the boring tool path. Moreover, this ambiguity is resolvable by monitoring the signal strength of the locating signal, preferably in the form of a vector sum. As the operator approaches the boring tool from point E, the signal strength should monotonically increase in value. Immediately upon passing over the boring tool, the signal strength will begin to decrease in value. While this first technique relies on beginning in regions 0 or 7, other techniques may begin at arbitrary points in any of the regions, as will be described. In addition, region 7 "becomes" region 0 upon reversal of the orientation of the locator by 180° such that the approach of the boring tool from either of the outer regions is similar with regard to flux orientation.

Continuing to refer to FIG. 22, a second flux orientation locating technique in resolving the ambiguity as to repetition of the flux orientation regions is to initially log a reference value of signal strength of the locating signal. For example, the signal strength of the locating field at either locate point C or locate point C' may be measured and stored. Thereafter, for any measured value of locating field strength which is greater than the stored value, it is known that such a measurement will be produced only at locations between the locate points (regions 2-5). If, the measured signal strength is less than the stored reference value, such a measurement will only be encountered outside the locate points on the boring tool's intended path (regions 0, 1, 6 or 7). In this regard, flux orientation ambiguity is eliminated, since each of the flux orientation regions positioned between the locate points (regions 2-5) have higher signal strengths compared to flux orientation regions outside the locate points (regions 0, 1, 6, 7). Furthermore, only one of each type of flux orientation region a-d is present between the locate points while only one of each type of flux orientation region is present outside of the locate points. For example, region 0 and region 4 both exhibit flux orientation characteristic a. However, the signal strength in region 0 is greatly reduced compared to the signal strength in region 4. A similar situation exists with certain pairs of the boundary points which define the regions. For example, points D and B' share an identical flux orientation, but the signal strength at point D is greatly reduced compared with that at point B'.

Briefly considering the first flux orientation locating technique with regard to FIG. 22, it should be appreciated that by beginning at a sufficient distance from the boring tool, an operator is reasonably assured of being in the far field region of the locating signal (region 0 between points E and D or region 7 between points E' and D'). For purposes of clarity, the present example begins by initially considering the approach of the boring tool from region 0 such that the locating signal flux orientation is between 0° and 45° CW from horizontal in the forward direction. The operator will become certain of beginning in region 0 as progression through the various flux orientation events proceeds in route to the boring tool, particularly when a combination of flux orientation and signal strength readings are used. It should be appreciated, however, that flux orientation values alone will serve in effectively locating the boring tool using the technique.

Referring to FIGS. 22 and 23, having generally described procedures used in flux slope orientation locating performed in accordance with the present invention, it is now appropriate to discuss specific details regarding the use of locating signal strength values obtained, for example, using circuit 500 of FIG. 21. FIG. 23 illustrates an X antenna configuration 565 consisting of antennas 482a and 482b. For purposes of simplicity, antenna 482a is denoted by a + symbol while antenna 482b is denoted by a − symbol. Dashed vertical and horizontal lines serve to divide the quadrants defined by the antennas into sub quadrants. By comparing FIGS. 22 and 23, it is observed that, as antenna configuration 565 is moved along the boring tool path, each of the flux lines corresponding to the particular one of the flux orientation characteristics a-d pass through or are oriented within a single sub quadrant of the antenna configuration, with respect to the horizontal direction. Specifically, as shown in FIG. 23, the flux lines for orientation characteristic a are located in a sub quadrant 570; the flux lines for orientation characteristic b are present in a sub quadrant 572; the flux lines for orientation characteristic c are present in a sub quadrant 574; and the flux lines for orientation characteristic d are present in a sub quadrant 576.

TABLE 2

| REGION | X Configuration Axes Dominant Signal | + Configuration Axes Dominant Signal | Flux Slope Characteristic |
|---|---|---|---|
| 0 | + | −' | a |
| 1 | + | +' | b |
| 2 | − | +' | c |
| 3 | − | −' | d |
| 4 | + | −' | a |
| 5 | + | +' | b |

TABLE 2-continued

| REGION | X Configuration Axes Dominant Signal | + Configuration Axes Dominant Signal | Flux Slope Characteristic |
|---|---|---|---|
| 6 | − | +' | c |
| 7 | − | −' | d |

Referring to Table 2 in conjunction with FIGS. 22 and 23, the + and − nomenclature referring to antennas 482a and 482b is used throughout Table 2. Within each of regions 0-7, one of either the + or − antennas will detect the locating signal with a greater or dominant signal strength, compared to the other one of the antennas. In this regard, the balance points, at which each antenna receives an equal signal strength, occur at points C (FLP), C' (RLP) and the overhead point A. These balance points, however, are not within to define the regions. Table 2 includes a "Region" column, an "X Axes Dominant Signal" column, a "Flux Slope Characteristic" column and one additional column to be described below. The table indicates, for each region, which antenna receives the dominant signal strength for the X axes configuration. For example, in region 0, the + antenna signal is dominant, in region 1, the + antenna signal is dominant, in region 2, the − antenna signal is dominant and in region 3, the − antenna signal is again dominant. This pattern then repeats in regions 4-7.

Referring to FIGS. 22-24 and Table 2, FIG. 24 illustrates a + antenna configuration generally indicated by the reference number 580 which consists of "virtual" antennas 482a' and 482b' that represent electronically rotated antennas 482a and 482b producing signals which may be obtained, for example, using circuit 500 of FIG. 21. For purposes of simplicity, antenna 482a' is indicated by a +' symbol while antenna 482b' is indicated by a −' symbol. The third column of Table 2 is a "+' Axes Dominant Signal" column that indicates which of antennas +' or −' receives the dominant signal strength. For example, in region 0, the −' antenna signal is dominant; in region 1, the +' antenna signal remains dominant; in region 2, the +' antenna signal is dominant; and in region 3, the −' antenna signal remains dominant. The region 0-3 pattern then repeats in regions 4-7, respectively.

Still referring to FIGS. 22-24 and Table 2, the flux slope orientation characteristic at the position of a portable locator is established in accordance with the present invention in a highly advantageous way by identifying the dominant antenna in each of the X and + antenna configurations at the position of the locator. Accordingly, having identified one of characteristics a-d, the position of the locator is limited to only two of the eight regions associated with the intended path. The foregoing techniques are used to resolve ambiguities regarding which region the locator is positioned in. For example, in one technique, the boring tool is approached from the far field regions such that the predetermined sequence of regions may be monitored up to and past the position of the boring tool. In another technique, signal strength may be used to resolve the ambiguity. A reference value is stored, for example, as measured at one of locate points C or C'. Because one of the two possible regions is always between the locate points while the other region is outside of the locate points, the locator will measure a signal strength at an unknown position between the locate points which is greater than the reference value while the locator will measure a signal strength that is less than the reference value at an unknown position that is not within the area between the locate points. Therefore, the ambiguity as to the two possible regions can be resolved based on signal strength. Still other techniques for establishing the reference value may be based on signal strength relationships at other known locations in the field.

Figure 25:
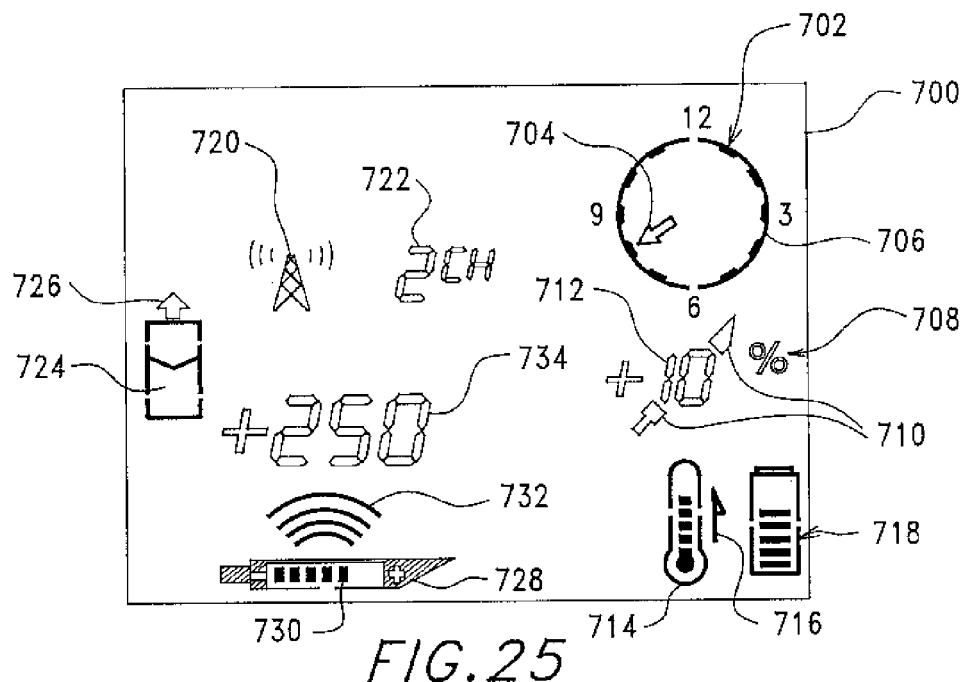
FIG. 25 is a diagrammatic illustration of one possible display which may be presented on a locating arrangement which conveys information to an operator including indications in accordance with the present invention as to the direction of the various flux orientation regions of FIG. 22 in relation to a current location of the locating arrangement and the signal strength of the locating signal. In particular, the locating arrangement is in a far field flux region.

Attention is now directed to FIGS. 22 and 25 for purposes of describing a third flux orientation locating technique. The third technique applies various concepts related to flux slope orientation (not described above) in combination, for example, with signal strength measurements in a highly advantageous way, serving to quickly and accurately locate the boring tool. This technique will be described in conjunction with the presentation of a series of figures beginning with FIG. 25, which illustrates the appearance of a display 700 produced in accordance with the present invention. Display 700 may be used in place of displays 296, 298 and 300 shown in FIG. 11. Alternatively, the information conveyed by display 700 may be displayed by any suitable combination of displays 296, 298 and 300 of FIG. 11. Display 700 includes a roll orientation display 702, illustrating the roll orientation of boring tool 28 using an arrow 704 on a clock face 706. A pitch orientation display 708 includes a boring tool symbol 710 upon which is superimposed a numerical pitch reading 712. In the present example, boring tool symbol 710 is pitched upward at 10 percent grade; however, the display is also capable of showing a boring tool symbol pitched downward (not shown) in view of the sign of numerical pitch reading 712. Display 700 further includes a temperature icon 714 which is generally shaped in the form of a thermometer for indicating the temperature measured within the boring tool. This temperature is indicated by a bar type display within the icon. An arrow 716 indicates whether recent changes in the boring tool temperature are rising or falling (a rising indication presently provided). A battery icon 718 indicates the remaining capacity of the locator battery using a bar graph style therein.

Continuing with a description of FIG. 25, a telemetry activation icon 720 illustrates the telemetry system is functioning and sending data to the drill rig from locator 36. One arrangement describing the use of such a telemetry signal is described in U.S. Pat. No. 5,698,981, TECHNIQUE FOR ESTABLISHING AT LEAST A PORTION OF AN UNDERGROUND PATH OF A BORING TOOL. A telemetry channel display 722 is shown indicating that the system is using channel 2. In accordance with the present invention, a locator icon 724 is illustrated in display 700. The areas above and below locator icon 724 are substantially open and that these areas will be used in position indication scenarios to be described at appropriate points below. In this regard, arrow 726 will be further described below following a description of the remaining portions of display 700.

Display 700 further includes a boring tool icon 728 having a bar graph display 730 indicating the capacity remaining in the battery within the boring tool which powers the locating signal transmitter. Moreover, a series of four signal transmission arcs 732 illustrate whether locating signal strength is increasing (lines radiate outwardly) or decreasing (lines radiate inwardly). Immediately above arcs 732 is a digital signal strength display 734 comprised of three digits and a +/− sign indication such that the maximum displayable signal strength is plus or minus 999 (not shown). A signal strength of "+250" is shown. The +/− portion of display of signal strength display 734 is used for the purpose of indicating which antenna in the X or X-equivalent configuration has the greater signal strength as described above.

Referring to FIGS. 22 and 25, assuming that receiver 36 is positioned at some unknown point on ground surface 560 when the receiver is initially powered on, the locator will make an initial determination as to which type of flux orientation characteristic type a-d it is positioned within. Since no reference signal strength value for the locating signal has been measured, the maximum signal strength value is initially stored (i.e., "999"). If the flux slope is initially detected as less than 45° (which corresponds to flux slope characteristic a), it will be assumed that the receiver is in region 0. Therefore, all locate information is ahead of the operator at the present position facing the boring tool. Previously described arrow 726 is then displayed indicating to the operator to move ahead (in the reverse direction with respect the boring tool forward direction). Conversely, if the operator were to begin in region 7 with the locator oriented in the forward direction facing the boring tool, the flux slope is indistinguishable from that in region 0 without further information. For example, the operator may determine the approximate length of the drill string and position the locator at a distance sufficient from the boring tool so as to insure that the locator is in region 0. In any event, regions 0 and 7 are readily distinguished by other characteristics. For example, flux intensity will increase when moving toward the drill rig in region 0 while flux intensity will decrease when moving toward the drill rig in region 7. The locating logic also functions properly even if the receiver is almost directly above the transmitter when initially powered on.

It is considered to be advantageous to perform locating from ahead of the boring tool, for example, beginning in region 0. This consideration is founded in the value of predicting the position of the boring tool subsequent to its current position. In other words, locating from the drill rig toward the boring tool is readily performed in accordance with the teachings herein using flux orientation locating; however, it should be appreciated that positions are being located which the boring tool has already passed. By locating from ahead of the boring tool, predictions as to the future position provide valuable information to the operator. For instance, locating can be performed from the forward locate point. Tracking positional changes in the forward locate point indicate the heading of the boring tool. Even a small torque applied to the drill head in being oriented for a turn can produce a large change in the location of the forward locate point. At least one other advantage derived from locating beginning ahead of the tool will be described at an appropriate point below.

Figure 26:
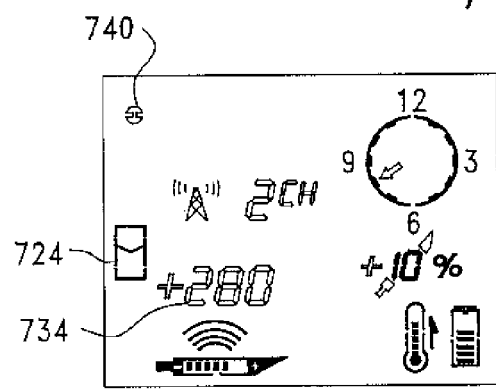
FIG. 26 is the display of FIG. 25 after moving the locating arrangement partially toward the boring tool such that a locate point target is displayed ahead of a locator icon.

Referring to FIGS. 22 and 26, the latter shows display 700 after movement of the locator toward the boring tool. As in previous examples, the forward direction is considered to be the forward direction along the intended path of the boring tool such that this movement may be referred to as being in the reverse direction. It should be appreciated that for purposes of positional analysis, the boring tool is considered to be static. Since FIG. 26, like FIG. 25, shows display 700, only changes in the display will be described for purposes of brevity. If locator 36 is moved into a region with flux characteristic b, a locate point target 740 appears in display 700 ahead of locator icon 724. At the same time, signal strength display 734 now displays the value "+280", increasing above the previous value in FIG. 25. Intuitively, the operator will continue moving the locator in the reverse direction toward locate point target 740 and thereby the boring tool.

Figure 27:
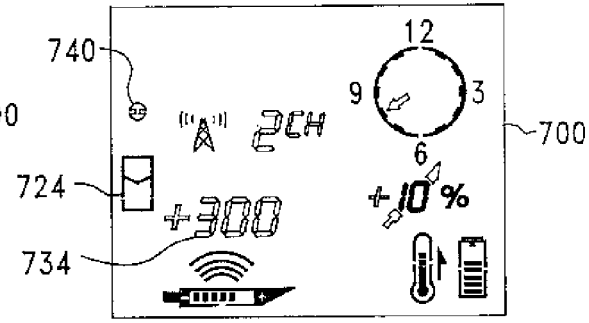
FIG. 27 is the display of FIG. 25 after still further movement of the locating arrangement toward the boring tool such that the locate point target is still closer to the locator icon.

Referring to FIGS. 22 and 27, flux slope monitoring occurs throughout movement of the locator using, (for example, circuit 500 of FIG. 21) without the active intervention of the operator. FIG. 27 illustrates the appearance of display 700 with the locator at a point midway between points D and C in region 1. Note that locate point target 740 has moved closer to locator icon 724 and that signal strength display 734 has increased to "+300". At this juncture, it is noted that any time a region is entered from region a having flux slope characteristic b (regions 1 or 5), a locate point (C or C') will be encountered with continuing movement toward the drill rig.

Figure 28:
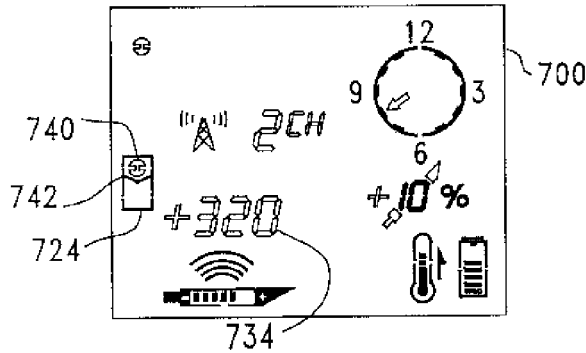
FIG. 28 is the display of FIG. 25 showing the locate point target at the locator icon after moving the locating arrangement to the indicated locate point.

Referring to FIGS. 11, 22 and 28, by continuing to move the locator toward the boring tool so as to move locate point target 740 toward locator icon 714, locate point target 740 will be placed into a display area 742 of locator icon 724. Accordingly, the operator is at locate point C, assuming the locator is substantially above the intended path of the boring tool, as will be further discussed. Note that signal strength display 734 has now increased to "+320". Having arrived at a locate point, it is now useful to store a reference signal strength measurement. The operator does so by actuating trigger 294 (FIG. 11) on the locator to record the reference signal strength value as "+320". In one embodiment, the reference signal strength is stored automatically responsive to two conditions: 1) trigger 294 is actuated and 2) the locating field flux is oriented either vertically or horizontally. In fact, one-half the measured signal strength is stored to accommodate measurement of higher values, for example, if the reference value is taken at a locate point or slightly off position from the overhead point directly above the boring tool.

Figure 29:
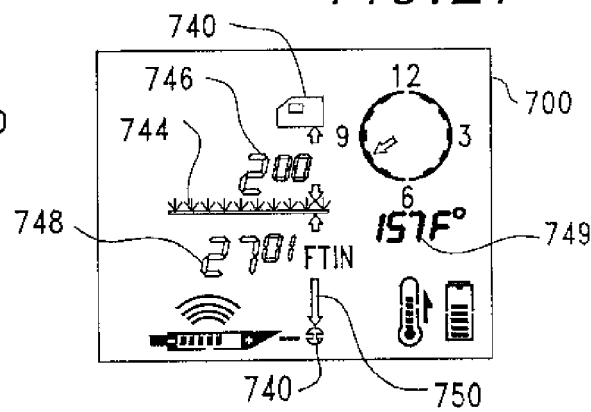
FIG. 29 illustrates the appearance of the display of FIG. 25 at the locate point upon actuation of a calibration feature to store a reference signal strength and showing distance of the locator above the surface of the ground as well as a predicted depth of the boring tool and its temperature.

Referring to FIGS. 11, 22 and 29, with trigger 294 actuated, display 700 appears as shown in FIG. 29 in the vicinity of a locate point. Specifically, locator icon 740 is shown at a distance above the surface of the ground which is indicated by the reference number 744. Additionally, a height display 746 gives a digital readout of this height which is indicated in the present example as two feet, zero inches. Below the height display, a boring tool depth display 748 shows the predicted depth of the boring tool at target point 740. The procedure for computing the predicted depth is described U.S. patent application Ser. No. 09/047,874, BORING TECHNIQUE USING LOCATE POINT MEASUREMENTS FOR BORING TOOL DEPTH PREDICTION, which by reference is incorporated herein. Since the depth of the boring tool measured from a locate point is a predicted depth, boring tool depth display 748 illustrates this predicted depth measurement as being ahead of the boring tool using an arrow 750 displayed so as to emphasize to the operator that this is a predicted depth. It is noted that the predicted depth obtained by locating ahead of the boring tool is highly advantageous in guiding the boring tool. Generally, the operator will have a fairly certain idea of the required depth of the bore. If the predicted depth violates, for example, a minimum depth requirement, the operator is able to take corrective action before any violation of the minimum depth actually occurs. In the present example, a predicted depth reading of 27 feet, 1 inch is displayed. A temperature indication 749 also apprises the operator of the boring tool temperature which is shown in this example as 157° F.

Figure 30:
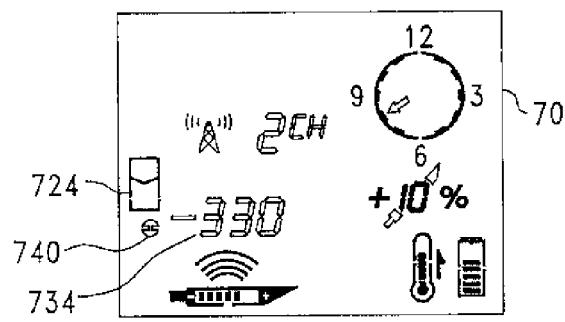
FIG. 30 is the display of FIG. 25 showing the locate point target behind the locator icon as the locating arrangement is moved toward the boring tool beyond the locate point.

Referring to FIGS. 22 and 30, after having stored a reference signal strength at locate point C, the operator continues to move locator 36 toward the boring tool causing display 700 to show locate point target 740 behind locator icon 724. With the signal strength increasing to the value "−330" in signal strength display 734; however, the sign of the reading has changed from plus to minus indicating that the operator has moved past the locate point and into region 2 having flux orientation characteristic c.

Figure 31:
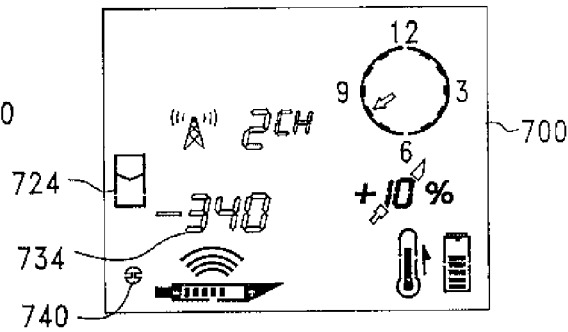
FIG. 31 is the display of FIG. 25 showing the locate point target still further behind the locator icon as the locator arrangement is moved increasingly closer to the boring tool.

Directing the reader's attention to FIGS. 22 and 31, locate point target 740 is left still further behind locator icon 724 as the operator moves away from locate point C towards point B. The signal strength in signal strength display 734 has now risen to "−340".

Figure 32:
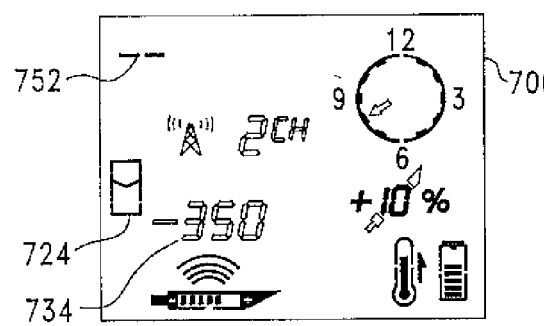
FIG. 32 is the display of FIG. 25 showing a locate line at a distance from the locator icon indicating the position of the boring tool with possible lateral variation as the locating arrangement approaches the boring tool.

Turning to FIGS. 22 and 32, and after passing point B, display 700 presents a locate line 752 ahead of locator icon 724. Locate line 752 is intended to be centered on the locating signal transmitter within the boring tool and perpendicular to the axis of the transmitter (i.e., perpendicular to the intended path). The signal strength in display 734 is up to "−350".

Figure 33:
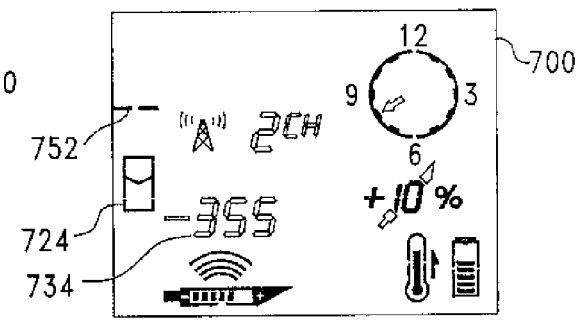
FIG. 33 is the display of FIG. 25 showing the locate line very near the locator icon as the distance to the boring tool is further reduced.

Referring to FIGS. 22 and 33, as the locator is moved further toward the boring tool, locate line 752 has approached locator icon 724 while signal strength display 734 has increased to "−355" approximately midway into region 3.

Figure 34:
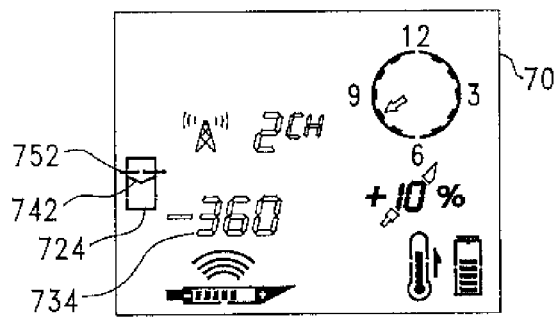
FIG. 34 is the display of FIG. 25 showing the locate line superimposed on the locator icon, indicating that the locator is at the overhead point directly above the boring tool with possible lateral variation.

FIG. 34 illustrates display 700 at point A (FIG. 22) with the locator substantially above the boring tool such that locate line 752 is within display 742 of locator icon 724. The signal strength is now "−360" on signal strength display 734. At this point, the operator once again actuates trigger 294.

Figure 35:
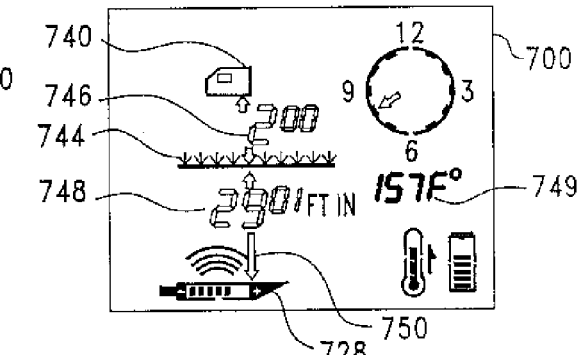
FIG. 35 illustrates the appearance of the display of FIG. 25 at the overhead point upon actuation of the calibration feature showing distance of the locator above the surface of the ground as well as a measured depth of the boring tool and its temperature.

Referring to FIGS. 11, 22 and 35, actuation of trigger 294 causes display 700 to display depth indications. Specifically, as in FIG. 29, locator icon 740 is shown at a distance above the surface of the ground which is indicated by reference number 744. Additionally, height display 746 again gives a digital readout of this height as two feet zero inches. Below the height display, boring tool depth display 748 shows the depth of the boring tool as 29 feet, 1 inch. Arrow 750 is now extending directly between ground surface 744 and boring tool icon 728 so as to indicate an actual current measured depth, rather than a predicted depth. It should be noted that the predicted depth shown in FIG. 29 is determined in view of the pitch of the boring tool. In this instance the boring tool is pitched upward at a 10 percent grade such that the predicted depth (FIG. 29) is less than the measured depth (FIG. 35) directly over the boring tool. As noted above, in one embodiment, a new reference signal strength is automatically stored when trigger 294 is actuated at point A.

Figure 36:
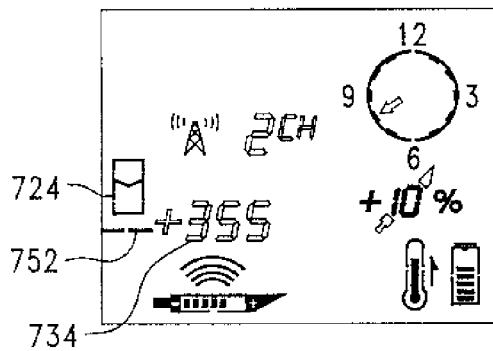
FIG. 36 is the display of FIG. 25 showing the locate line behind the locator icon as the locating arrangement is moved ahead of the boring tool along its intended path.

Referring to FIGS. 22 and 36, having located point A, substantially above the boring tool, the operator may continue moving the locator along and above the intended path of the boring tool, in order to confirm the location of the boring tool by finding the rear locate point and/or using that rear locate point in some manner for future locating. Should the operator continue, moving into region 4, locate line 752 will appear behind locator icon 724. The signal strength in signal strength display 734 has decreased in magnitude to "355" while the sign has changed from − to +, as a result of passing the overhead point. It should be appreciated that signal strengths at symmetric points in the locating field ahead of and behind the boring tool, such as at the forward and rear locate points, will exhibit equal signal strength readings only if the boring tool is traveling horizontally and the ground is level above the boring tool. For purposes of clarity, the variation in signal strength attributable to non-zero pitch of the boring tool has been ignored in the present example.

Figure 37:
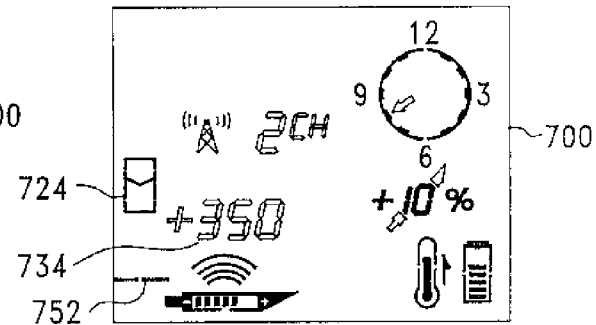
FIG. 37 is the display of FIG. 25 showing the locate line still further behind the locator icon as movement of the locating arrangement continues in the forward direction.

Referring to FIGS. 22 and 37, upon approaching point B' with continuing movement away from the location of the boring tool, locate line 752 will appear still further behind locator icon 724. The signal strength in signal strength display 734 has decreased to "+350".

As the operator continues moving forward, region 5 is entered exhibiting flux slope characteristic b. As described above, a locate point is always ahead of a region having flux slope characteristic b as one moves in the reverse direction. Therefore, display 700 may appear as in FIG. 26 except that signal strength display 734 displays a value that is greater than the signal strength at a locate point but less than the signal strength at point B (within the range between "+320" to "+340"). Continuing movement will provide a display corresponding to FIG. 27, with locate point target 740 closer to locator icon 724, however, the signal strength will continue to decrease to a value approaching "+320". When the locator is at point C', display 700 will appear as in FIG. 28. At this time the operator has found both locate points and point A overhead of the boring tool. Should the operator continue moving ahead, the forward locate point at point C' will fall behind the locator icon in a manner similar to that shown in FIGS. 30 and 31 with appropriately lower signal strength values. It is noted that the operator may actuate trigger 294 at the RLP. Display 700 will be similar to the illustration of FIG. 29 with some variations. For example, the locator will be behind the boring tool rather than ahead of it. Moreover, the "predicted" depth at the RLP is less meaningful than that at the FLP since it does not really represent a prediction of a future depth, but a previous depth behind the boring tool. Additionally, the predicted depth at the RLP should be determined including the step of changing the sign of the pitch, since such predicted depth determinations performed herein assume a position ahead of the boring tool.

Figure 38:
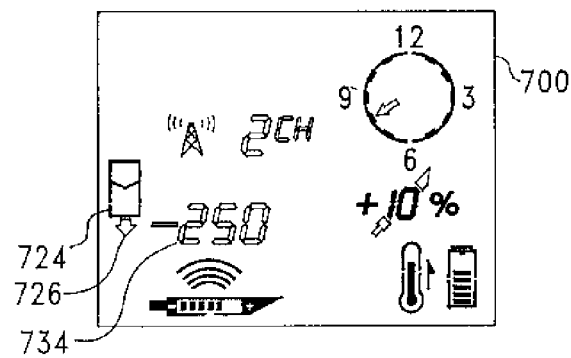
FIG. 38 is the display of FIG. 25 showing an arrow indication pointing to the rear from the locator icon as the locating arrangement moves into a far field region ahead of the boring tool.

Referring to FIGS. 22 and 38, should the operator move into region 7, having flux slope orientation characteristic d, arrow 726 on display 700 will point in a rearward direction from locator icon 724 indicating to the operator that all of the locate information is now behind the locator with a signal strength of "−250" or less on signal strength display 734.

Referring to FIG. 22, while the third locating technique is described with regard to following the entire intended path of the boring tool, this technique is readily adaptable to beginning at essentially any point relative to the intended path. Upon power up, the locator of the present invention will set its signal strength reference value to a maximum, identify the flux slope orientation characteristic at its present location and measure the signal strength of the locating signal. As a first example, it will be assumed that locating is initiated within a region characterized by flux slope orientation characteristic b. Therefore, a locate point will be found by moving in the reverse direction irrespective of whether the locator is in region 1 or region 5. Accordingly, display 700 may be configured to show locate point target 740 ahead of the locator icon in the manner illustrated by FIG. 26. The operator may then move the locator to the locate point, placing the locate point target within locator icon 724, as described with regard to FIG. 28. At the locate point, a signal strength reference value should be stored. The locate point can be identified as a forward or rear locate point based on signal strength. If the signal strength increases upon moving from the locate point, the operator is entering region 2 headed toward the boring tool. If the signal strength decreases, the operator is leaving point C', heading into region 6. In either instance, the operator may readily back track to point A in view of the foregoing descriptions.

Still referring to FIG. 22, as a second example of the flexibility of the third locating technique, it will be assumed that locating begins in a region having flux slope orientation characteristic c. In this situation, a locate point is always ahead with respect to the forward direction. Thus, if the locator is oriented in the reverse direction, a target locate point will be displayed behind the locator in a manner similar to that shown in FIGS. 30 or 31 to guide the operator in the forward direction to the locate point. Once the locate point has been found and a reference signal strength value stored, the operator will immediately discover whether the forward or rear locate point was found by proceeding as described immediately above.

Having described locating beginning in regions having flux slope orientation characteristics b and c, beginning in an a or d type region will now be considered with reference to FIG. 22. For an a type flux region 0 or 4, at least one locate point will always be ahead of the locator in the reverse (or forward) direction. In this event, continuing to orient the locator in the reverse direction, display 700 may present arrow 726 directed forward as shown in FIG. 25. To guide the operator to the locate point, the forward and rear locate points may be distinguished as described above. For a d type flux region 3 or 7, it is recognized that at least one locate point will always be behind the locator in the forward direction. Therefore, display 700 may present arrow 726 directed rearward as shown in FIG. 38. Upon finding the locate point, a reference signal strength value may be stored and the locate point may be distinguished as a forward or rear locate point. The locating procedure may then be completed. It should be noted that the locating procedure may be sufficiently complete with the identification of one of the locate points. That is, a predicted depth is known and the lateral distance to the boring tool can readily be estimated. Using this information, a drilling operation may be controlled from either of the locate points, but the forward locate point provides a more accurate prediction of the bore path.

The descriptions referencing FIGS. 13-38 are limited to locating with the locator properly oriented and directly above the intended path of the boring tool. That is, the plane defined by the orthogonal antennas within the locator is vertically oriented to extend generally along the intended path. It should be appreciated that the operator may be assisted in any suitable manner in maintaining the orientation of the locator. For example, a direction sensor (not shown) may be provided on the locator such as a compass or magnetometer to help eliminate problems associated with rotations of the locator about a vertical axis during the locating process.

Referring briefly to FIG. 28, in an off path orientation, the operator may receive the indication shown in FIG. 28 (locate point target within locator icon 724) even though the locator is to the side of the intended path rather than directly above. Therefore, at each vertical balance point (forward locate point C' or rear locate point C, as shown in FIG. 22), an operator should turn the locator by 90° to the intended path. If the locator is directly above the intended path, locate point target 740 will remain within display window 742 of locator icon 714. If, however, the locator is to either side of the intended path, locate point target 740 will move ahead or behind locator icon 724 as shown, for example, in FIGS. 27 and 30, respectively. By moving the locator perpendicular to the intended path, locate point target 740 may be moved back into locator icon 724, ensuring that the locator is now substantially above the intended path with reference to the actual locate point. The horizontal flux balance for a level transmitter is a plane perpendicular to the axis of the transmitter. If the transmitter is not level then there is a corresponding plane perpendicular to the axis of the transmitter that has a flux slope equal to the slope of the transmitter's axis. This flux relationship can be used to locate the transmitter from the side when access above the transmitter is restricted. Locating to the side with the above described procedure is the same as for Regions 3 and 4, except the signal strength at the horizontal balance point (point A extended) is used for reference.

With reference to FIG. 21 it should be appreciated that the present invention contemplates the use of circuit 500 cooperating with additional circuitry (not shown) for electronically rotating antennas 482a and 482b in an automated manner. That is, the use of the four locating field measurements obtained using these antennas in conjunction with the circuit is completely transparent to an operator using locator 36. In this regard, signal strength monitoring is performed in a particular way when a balance point is approached using the X or + antenna configuration. Specifically, if the configuration exhibits a substantially weaker signal in one of the antennas, then the other configuration is favored. For example, on approaching a locate point, the + antenna configuration exhibits a null on the horizontal antenna. Therefore, the X antenna configuration is preferring in traversing such a balance point. This switching function is automated. It is to be understood that programming for implementation of the methods described herein is considered to be within the ability of one having ordinary skill in the art in view of this overall disclosure. It is also possible to interface (not shown) antennas 482a and 482b of FIG. 21 with the circuitry of FIG. 18. This may be accomplished, for example, by connecting the output of amplifier 454a, at a node 760 (FIG. 21), to a node 762 at one side of capacitor C404 (FIG. 18). At the same time, the output of amplifier 454b, at a node 764 (FIG. 21), is connected to a node 766 (FIG. 18) at one side of capacitor C502. In such an implementation, antennas 452a and 452b, including associated amplifiers 454a and 454b in FIG. 18, may be eliminated. By combining the circuitry of FIGS. 18 and 21, a vector sum signal is available in addition to the sum and difference signals generated by receiver 500 of FIG. 21.

Figure 39:
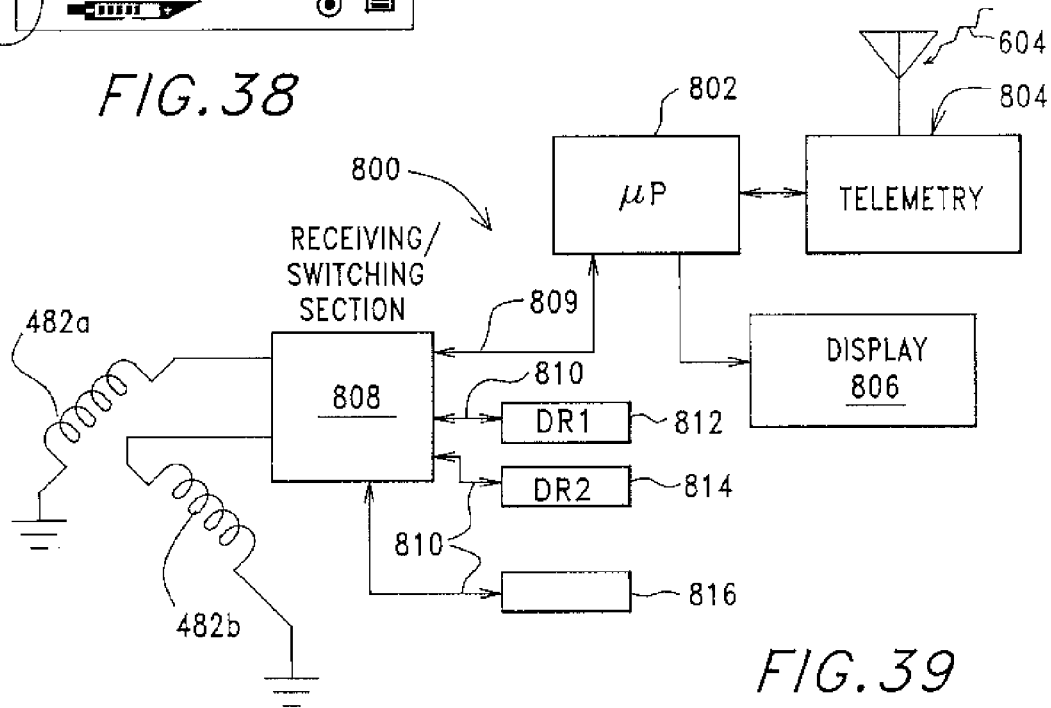
FIG. 39 is a schematic in block diagram form of a locator manufactured in accordance with the present invention.

Referring to FIG. 39, a block diagram of a locator manufactured in accordance with the present invention is generally indicated by the reference number 800. Locator 800 includes a microprocessor 802 interfaced with a telemetry section 804 which may, for example, receive phase signal 604 (FIG. 2). Further components include a display 806 and a locating signal receiving/switching section 808 which is configured for automatic switching of antennas 482a and 482b and which incorporates the circuitry of FIGS. 18 and 21, described above. The cooperating switching circuitry within section 808 may be designed by one having ordinary skill in the art in view of this disclosure. A bidirectional connection 809 connects microprocessor 802 with receiving section 808. Other bidirectional lines 810 connect receiving section 808 to a first depth/range receiver 812, a second depth/range receiver 814 and a roll/pitch receiver 816. In this way, antennas 482a and 482b are connectable directly to depth receivers DR1 and DR2 when it is desired to use the X antenna configuration. When the + antenna configuration is needed, the circuitry of FIG. 21 is interposed between antennas 482a and 482b and depth receivers DR1 and DR2, respectively, so as to provide sum and difference signals to the depth receivers. The vector sum signal generated by the circuitry of FIG. 18 is provided to roll/pitch receiver 816.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. In an overall system in which a dipole electromagnetic transmitter is disposed within a given region along a bore path while transmitting a dipole locating field, a portable locator comprising:
   at least first and second antennas positioned at least generally orthogonally with respect to one another; and
   no more than one receiver circuit for at least substantially simultaneously sensing at least respective first and second orthogonal components of said locating field, using the first and second antennas, to produce a vector sum therefrom which exhibits a monotonic variation in signal strength that eliminates at least one ghost signal maximum, which ghost signal maximum could otherwise be present in a single antenna signal strength pattern.

2. The portable locator of claim 1 wherein said single antenna signal strength pattern exhibits a null in signal strength and wherein said dipole locating field carries certain information relating to an orientation of the dipole electromagnetic transmitter and said portable locator is configured for detecting said certain information at a position that corresponds to said null point which would otherwise be undetectable when a single receiving antenna is used.

3. The portable locator of claim 1 wherein said receiver circuit uses only passive electrical components.

4. The portable locator of claim 1 wherein said receiver circuit includes a summing amplifier for combining the first and second antenna components in a way that produces said vector sum.

5. The portable locator of claim 4 wherein said receiver circuit is configured for phase shifting said first and second orthogonal components to generate first and second phase shifted signals and said summing amplifier sums the first and second phase shifted received signals to generate said vector sum.

6. The portable locator of claim 5 wherein said receiver is configured to subject said first orthogonal component to one phase shift in a first angular direction by a particular angular magnitude to generate said first phase shifted signal, and to subject said second orthogonal component to another phase shift that is equal to said particular angular magnitude but in a second angular direction that is the opposite of said first angular direction to generate said second phase shifted signal.

7. The portable locator of claim 1 including an electronic processor that is configured for determining a distance from the portable locator to the dipole electromagnetic transmitter based on said signal strength.

8. In an overall system in which a dipole electromagnetic transmitter is disposed within a given region along a bore path while transmitting a dipole locating field, a portable locator comprising:
   at least first and second antennas positioned at least generally orthogonally with respect to one another; and
   no more than one receiver circuit for at least substantially simultaneously sensing at least respective first and second orthogonal components of said locating field, using the first and second antennas, to produce a vector sum therefrom which exhibits a monotonic variation in signal strength that eliminates a signal strength null which signal strength null would otherwise be present in a single antenna signal strength pattern.

9. In an overall system in which a dipole electromagnetic transmitter is disposed within a given region along a bore path while transmitting a dipole locating field, a method comprising:
   positioning at least first and second antennas at least generally orthogonally with respect to one another for receiving said dipole locating field; and
   arranging a portable locator with no more than one receiver circuit for at least simultaneously sensing at least respective first and second orthogonal components of said locating field, using the first and second antennas, to produce a vector sum therefrom which exhibits a monotonic variation in signal strength that eliminates at least one ghost signal maximum, which ghost signal maximum could otherwise be present in a single antenna signal strength pattern.

10. The method of claim 9 wherein said single antenna signal strength pattern exhibits a null in signal strength and wherein said dipole locating field carries certain information relating to an orientation of the dipole electromagnetic transmitter and configuring a portable locator to detect said certain information at a position that corresponds to said null point which would otherwise be undetectable when said single receiving antenna is used.

11. The method of claim 9 including configuring said receiver circuit with only passive electrical components.

12. The method of claim 9 including combining the first and second orthogonal components in a way that produces said vector sum using a summing amplifier.

13. The method of claim 12 including configuring said receiver circuit for phase shifting said first and second orthogonal components to generate first and second phase shifted signals and said causing the summing amplifier to sum the first and second phase shifted received signals to generate said vector sum.

14. The method of claim 13 wherein said receiver circuit subjects said first orthogonal component to one phase shift in a first angular direction by a particular angular magnitude to generate said first phase shifted signal, and subjects said second orthogonal component to another phase shift that is equal to said particular angular magnitude but in a second angular direction that is the opposite of said first angular direction to generate said second phase shifted signal.

15. The method of claim 9 including using an electronic processor that is configured for determining a distance from the portable locator to the dipole electromagnetic transmitter based on said signal strength.

16. In an overall system in which a dipole electromagnetic transmitter is disposed within a given region along a bore path while transmitting a dipole locating field, a portable locator comprising:
   at least first and second antennas positioned at least generally orthogonally with respect to one another; and
   no more than one receiver circuit for using antenna outputs of both the first and second antennas to produce a vector sum therefrom which exhibits a monotonic variation in signal strength that eliminates at least one ghost signal maximum in a single antenna signal strength pattern.

17. In an overall system in which a dipole electromagnetic transmitter is disposed within a given region along a bore path while transmitting a dipole locating field, a method comprising:
   positioning at least first and second antennas at least generally orthogonally with respect to one another; and
   configuring no more than one receiver circuit for using antenna outputs of both the first and second antennas to produce a vector sum therefrom which exhibits a monotonic variation in signal strength that eliminates at least one ghost signal maximum in a single antenna signal strength pattern.

* * * * *